(12) United States Patent
Hsieh et al.

(10) Patent No.: US 7,853,228 B2
(45) Date of Patent: Dec. 14, 2010

(54) SIGNAL RELAY APPARATUS, METHOD, AND COMPUTER READABLE MEDIUM ADAPTED FOR WIRELESS NETWORK

(75) Inventors: Chih-Chiang Hsieh, Jen-Wu Township (TW); Yi-Hsueh Tsai, Taipei County (TW); Yung-Ting Lee, Taipei (TW)

(73) Assignee: Institute for Information Industry, Taipei (TW)

( * ) Notice: Subject to any disclaimer, the term of this patent is extended or adjusted under 35 U.S.C. 154(b) by 914 days.

(21) Appl. No.: 11/677,937

(22) Filed: Feb. 22, 2007

(65) Prior Publication Data

US 2008/0108317 A1 May 8, 2008

(30) Foreign Application Priority Data

Nov. 6, 2006 (TW) ............................. 95141015 A

(51) Int. Cl.
 H04B 7/00 (2006.01)
(52) U.S. Cl. .................. 455/232.1; 455/136; 455/206; 455/210; 455/254
(58) Field of Classification Search ............... 455/232.1
See application file for complete search history.

(56) References Cited

U.S. PATENT DOCUMENTS

| | | | | |
|---|---|---|---|---|
| 6,532,258 B1 * | 3/2003 | Goldston et al. | ............ | 375/227 |
| 6,895,219 B2 * | 5/2005 | Bridgelall | ............ | 455/41.2 |
| 7,177,662 B2 * | 2/2007 | Trachewsky et al. | ............ | 455/552.1 |
| 7,327,700 B2 * | 2/2008 | Venkatesh et al. | ............ | 370/326 |
| 7,383,549 B1 * | 6/2008 | Draganic | ............ | 719/310 |
| 7,505,735 B2 * | 3/2009 | Miyoshi | ............ | 455/11.1 |
| 7,508,750 B2 * | 3/2009 | Cleveland | ............ | 370/210 |
| 7,558,535 B2 * | 7/2009 | Cho et al. | ............ | 455/69 |
| 7,570,968 B2 * | 8/2009 | Huh et al. | ............ | 455/522 |
| 7,620,370 B2 * | 11/2009 | Barak et al. | ............ | 455/67.13 |
| 7,720,030 B2 * | 5/2010 | Solomon et al. | ............ | 370/329 |
| 7,760,700 B2 * | 7/2010 | Frederiks et al. | ............ | 370/347 |
| 2003/0040275 A1 * | 2/2003 | Bridgelall | ............ | 455/41 |
| 2005/0036541 A1 * | 2/2005 | McKown | ............ | 375/233 |
| 2005/0068931 A1 * | 3/2005 | Cho et al. | ............ | 370/345 |
| 2005/0143121 A1 * | 6/2005 | Huh et al. | ............ | 455/522 |
| 2005/0186923 A1 * | 8/2005 | Chen et al. | ............ | 455/127.1 |
| 2005/0243843 A1 * | 11/2005 | Imamura et al. | ............ | 370/401 |
| 2005/0249109 A1 * | 11/2005 | Cleveland | ............ | 370/203 |
| 2005/0265274 A1 * | 12/2005 | Cleveland | ............ | 370/320 |
| 2006/0028977 A1 * | 2/2006 | Izumi | ............ | 370/203 |
| 2006/0040619 A1 * | 2/2006 | Cho et al. | ............ | 455/69 |
| 2006/0187876 A1 * | 8/2006 | Schmidl et al. | ............ | 370/328 |
| 2006/0215774 A1 * | 9/2006 | Shor | ............ | 375/260 |
| 2006/0245355 A1 * | 11/2006 | Iwamura | ............ | 370/232 |
| 2007/0014273 A1 * | 1/2007 | Kuperschmidt et al. | ............ | 370/347 |
| 2007/0104129 A1 * | 5/2007 | Yang et al. | ............ | 370/329 |
| 2007/0121546 A1 * | 5/2007 | Zuckerman et al. | ............ | 370/329 |

(Continued)

*Primary Examiner*—Duc Nguyen
*Assistant Examiner*—Hai V Nguyen
(74) *Attorney, Agent, or Firm*—Patterson Thuente Christensen Pedersen, P.A.

(57) ABSTRACT

A signal relay apparatus, method, application program, and computer readable medium adapted for wireless network are capable of saving power consumption due to failure of adjusting amplifying gain dynamically and solving the difficulty of demodulation since noise is also amplified during relay. For wireless access network, the present invention decreases the transmission power of mobile devices so that the battery of the mobile devices may keep working longer and the interference inside is reduced.

25 Claims, 26 Drawing Sheets

U.S. PATENT DOCUMENTS

| | | | |
|---|---|---|---|
| 2007/0121573 A1* | 5/2007 | Zuckerman et al. | 370/350 |
| 2007/0121743 A1* | 5/2007 | Zuckerman et al. | 375/260 |
| 2007/0121744 A1* | 5/2007 | Zuckerman et al. | 375/260 |
| 2007/0121745 A1* | 5/2007 | Zuckerman et al. | 375/260 |
| 2007/0201566 A1* | 8/2007 | Solomon et al. | 375/260 |
| 2007/0202803 A1* | 8/2007 | Miyoshi | 455/11.1 |
| 2007/0223365 A1* | 9/2007 | Tsfaty et al. | 370/208 |
| 2008/0037675 A1* | 2/2008 | Lin et al. | 375/262 |
| 2008/0080628 A1* | 4/2008 | To et al. | 375/260 |
| 2008/0090575 A1* | 4/2008 | Barak et al. | 455/444 |
| 2008/0095254 A1* | 4/2008 | Muharemovic et al. | 375/260 |
| 2008/0130527 A1* | 6/2008 | Huh et al. | 370/280 |
| 2008/0298335 A1* | 12/2008 | Lee | 370/342 |
| 2009/0073916 A1* | 3/2009 | Zhang et al. | 370/315 |
| 2009/0081967 A1* | 3/2009 | Imamura | 455/101 |
| 2009/0141668 A1* | 6/2009 | Zhang et al. | 370/315 |
| 2009/0175366 A1* | 7/2009 | Maltsev et al. | 375/260 |
| 2009/0252065 A1* | 10/2009 | Zhang et al. | 370/256 |
| 2009/0303895 A1* | 12/2009 | Zhang et al. | 370/252 |
| 2009/0307484 A1* | 12/2009 | Zhang et al. | 713/153 |
| 2009/0310656 A1* | 12/2009 | Maltsev et al. | 375/219 |

* cited by examiner

SIGNAL RELAY APPARATUS, METHOD, AND COMPUTER READABLE MEDIUM ADAPTED FOR WIRELESS NETWORK

This application claims priority to Taiwan Patent Application No. 095141015 filed on Nov. 6, 2006.

CROSS-REFERENCES TO RELATED APPLICATIONS

Not applicable.

BACKGROUND OF THE INVENTION

1. Field of the Invention

The present invention relates to a signal relay apparatus, a method, and a computer readable medium; specifically to a signal relay apparatus, a method, and a computer readable medium capable of dynamically adjusting a gain for a wireless network.

2. Descriptions of the Related Art

Currently, a radio access network mainly consists of multiple base stations (BS) and subscriber stations (SS). With a network in which the base stations are distributed at suitable locations, the transmission should be performed in the whole area under limited transmission power. However, a shadow fading effect of signals caused by topography or man-made buildings has to be considered while a coverage range of the base stations is planned. For example, If signals are blocked by huge buildings, an effective coverage range must be reduced appropriately to ensure that the subscriber stations can still maintain transmission in its range. Alternatively, a signal relay apparatus is set up to relay signals.

FIG. 1 shows a diagram of a conventional signal relay apparatus 1 comprising a receiver 11, an amplifier 12 and a transmitter 13. The receiver 11 is configured to receive a wireless signal 14 and to convert the wireless signal 14 into a digital signal 15. The amplifier 12 is configured to amplify the digital signal 15 to generate an amplified signal 16. Finally, the transmitter 13 transmits the amplified signal 16 to overcome the shadow fading effect of signals and broaden a signal transmission range.

However, although the conventional signal relay apparatus 1 can effectively overcome the shadow fading effect of signals and broaden a signal transmission range, it can not dynamically adjust a gain of the amplifier 12 so that power consumption is considerable. On the other hand, since the amplifier 12 amplifies all received signals without difference, noise is also amplified. It makes de-modulation difficult for a device receiving the amplified signal 16. Consequently, how to dynamically adjust the gain of the amplifier 12 according to received signals and to further enhance an overall performance of the signal relay apparatus is still an object for the industry to endeavor.

SUMMARY OF THE INVENTION

To solve the mentioned problems, an objective of this invention is to provide a signal relay apparatus of a wireless network, which comprises a receiver, a converter, a controller, an adjuster, an amplifier and a transmitter. The receiver is configured to receive a wireless signal and convert the wireless signal into a digital signal, wherein the digital signal is identifiable to a physical layer of the wireless network. The converter is configured to convert the digital signal into information, wherein the information is identifiable to a data link layer of the wireless network. The controller is configured to generate a control signal after retrieving content related to the quality of the wireless signal from the information. The adjuster is configured to generate a gain adjustment signal according to the control signal. The amplifier is configured to adjust a gain for amplifying a processed signal generated in response to the digital signal according to the gain adjustment signal. The transmitter is configured to transmit the processed signal.

Another objective of this invention is to provide a method for relaying signals in a wireless network. The method comprises the following steps: receiving a wireless signal and converting the wireless signal into a digital signal, wherein the digital signal is identifiable to a physical layer of the wireless network; converting the digital signal into information, wherein the information is identifiable to a data link layer of the wireless network; generating a control signal after retrieving content related to the quality of the wireless signal from the information; generating a gain adjustment signal according to the control signal; adjusting a gain for amplifying a processed signal generated in response to the digital signal according to the gain adjustment signal; and transmitting the processed signal.

Yet a farther objective of this invention is to provide a computer readable medium storing an application program to execute a signal relay method. The signal relay method comprises the following steps: receiving a wireless signal and converting the wireless signal into a digital signal, wherein the digital signal is identifiable to a physical layer of the wireless network; converting the digital signal into information, wherein the information is identifiable to a data link layer of the wireless network; generating a control signal after retrieving content related to the quality of the wireless signal from the information; generating a gain adjustment signal according to the control signal; adjusting a gain for amplifying a processed signal generated in response to the digital signal according to the gain adjustment signal; and transmitting the processed signal.

The invention can effectively solve the problems of either power consumption caused by incapability of dynamically adjusting a gain or a difficulty of de-modulation caused by amplified noise. Specifically speaking, for radio access networks, transmission power of an end device may be reduced so that power consumption is saved, usage time is extended and interferences among a system is decreased when this invention is applied at the locations distant from a base station or having highly concentrated population.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
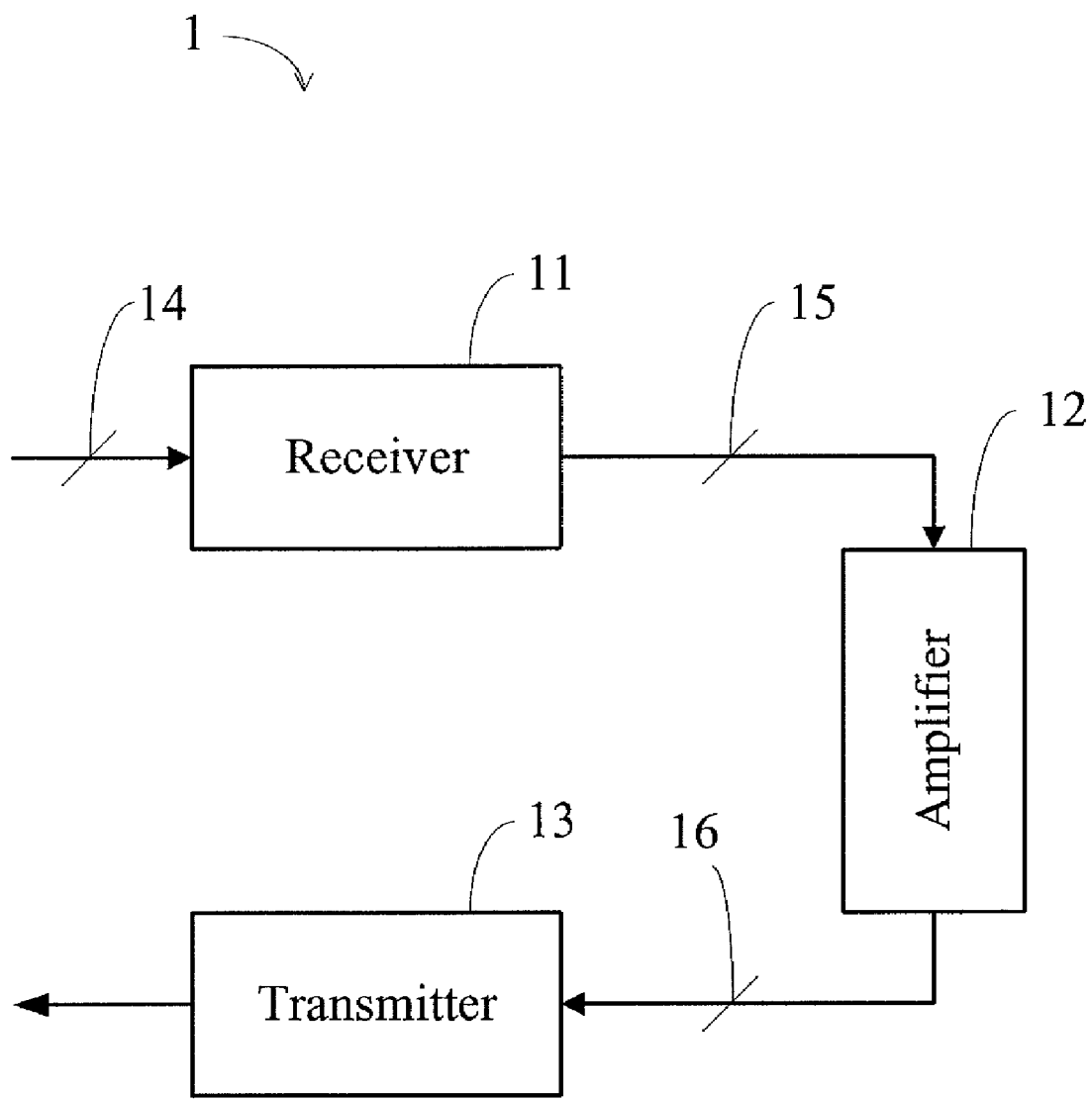
FIG. 1 is a diagram of a conventional signal relay apparatus.
Figure 2:
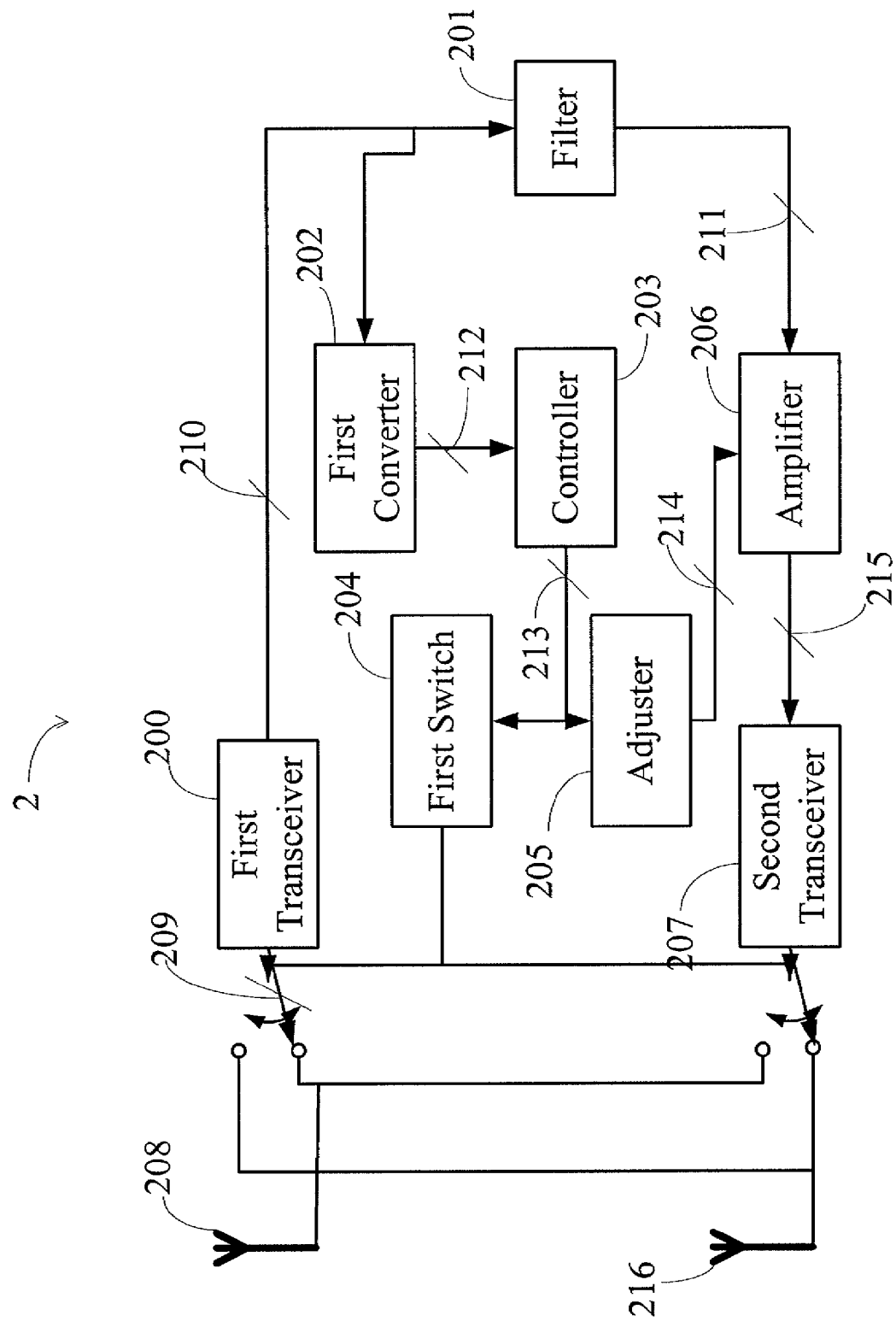
FIG. 2 is a diagram of a first embodiment of the invention.

A first embodiment of the invention is shown in FIG. 2 which shows a signal relay apparatus 2 adapted for a WiMAX wireless network. The signal relay apparatus 2 comprises a first transceiver 200, a filter 201, a first converter 202, a controller 203, a first switch 204, an adjuster 205, an amplifier 206, a second transceiver 207, an antenna 208 and an antenna 216. If the first transceiver 200 operates in a receiving mode, a wireless signal from a base station is going to be received. If the second transceiver 207 operates in a receiving mode, a wireless signal from a relay station, a subscriber station, or a mobile station is going to be received. In the signal relay apparatus 2, the first transceiver 200 operates as a receiver, and the second transceiver 207 operates as a transmitter.

Figure 3:
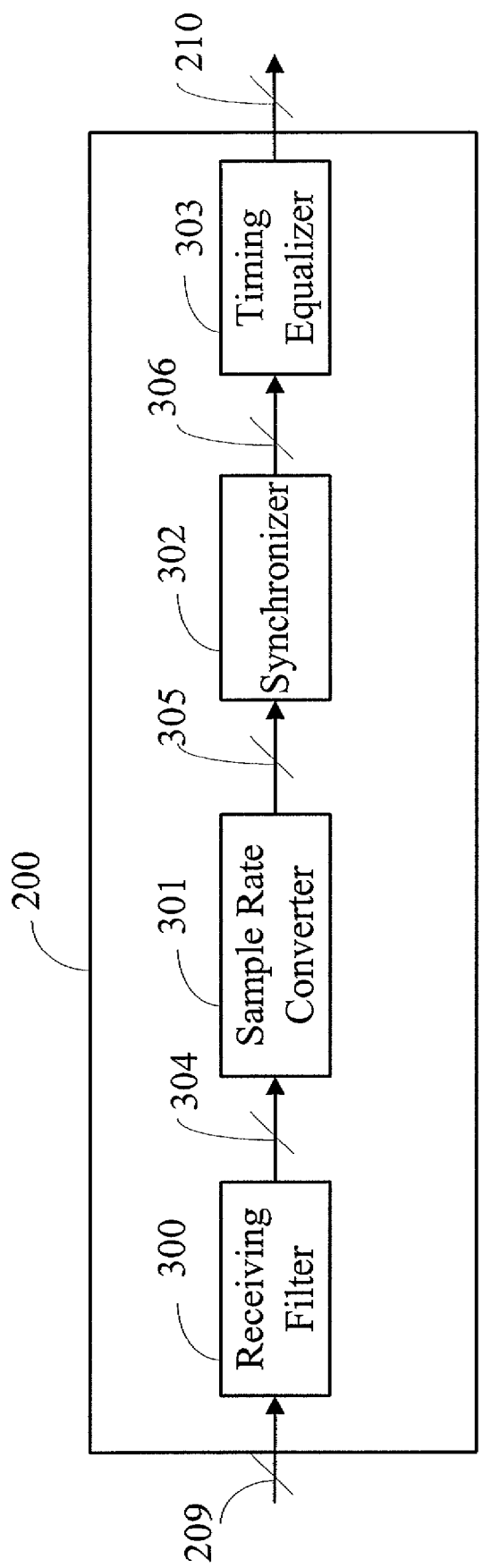
FIG. 3 is a diagram of a receiver of a first embodiment of the invention.
Figure 4:
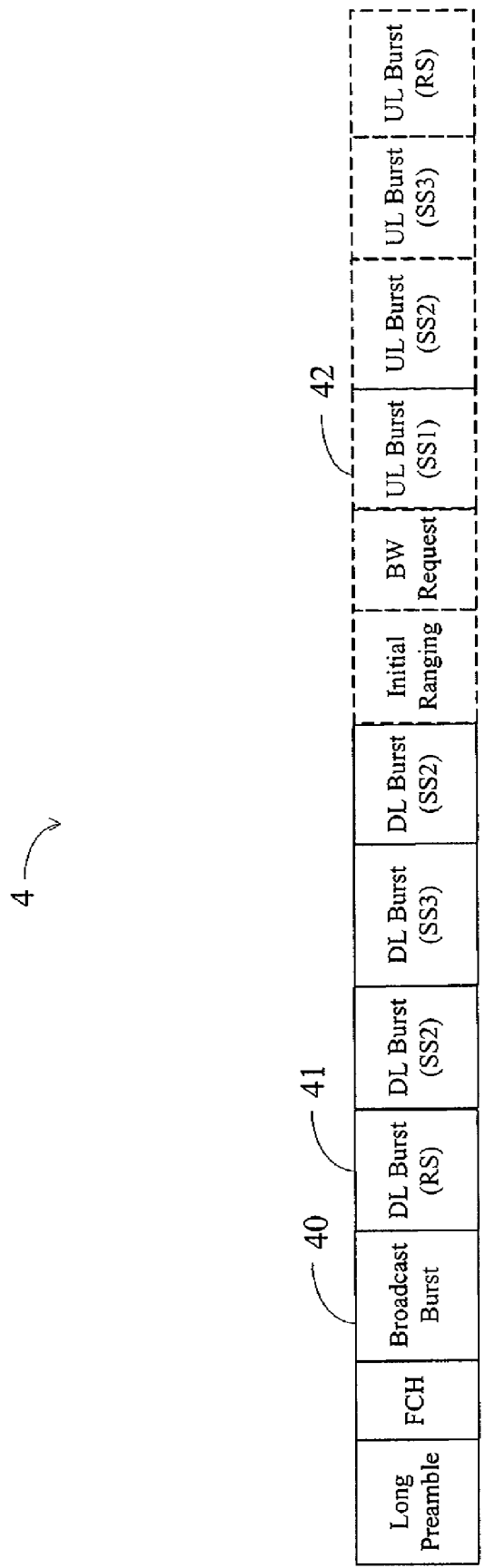
FIG. 4 is a diagram of a packet format of a WiMAX wireless network.

As shown in FIG. 3, the receiver 200 comprises a receiving filter 300, a sample rate converter 301, a synchronizer 302, and a timing equalizer 303. The receiving filter 300 may be a conventional filter adapted for a WiMAX wireless network to receive a wireless signal 209 from the antenna 208. After receiving the wireless signal 209, the receiving filter 300 filters and converts the wireless signal 209 into an initial digital signal 304, wherein the wireless signal 209 comprises a packet of the WiMAX wireless network 4 in the format as shown in FIG. 4. The format is defined in the WiMAX specification. The sample rate converter 301 may be a conventional sample rate converter adapted for the WiMAX wireless network to perform a sample rate conversion on the initial digital signal 304 to generate an initial digital signal 305 with an adjusted sample rate. The synchronizer 302 may be a conventional synchronizer adapted for the WiMAX wireless network to perform timing synchronization and frequency tracking on the initial digital signal 305 to generate a synchronized signal 306. The timing equalizer 303 eliminates a channel effect of the synchronized signal 306 to generate a digital signal 210. The timing equalizer 303 may be a conventional timing equalizer adapted for the WiMAX wireless network. The digital signal 210 is identifiable to a physical layer of the network. After filtering noise by the filter 201, the digital signal 210 becomes a transmission signal 211.

Figure 5:
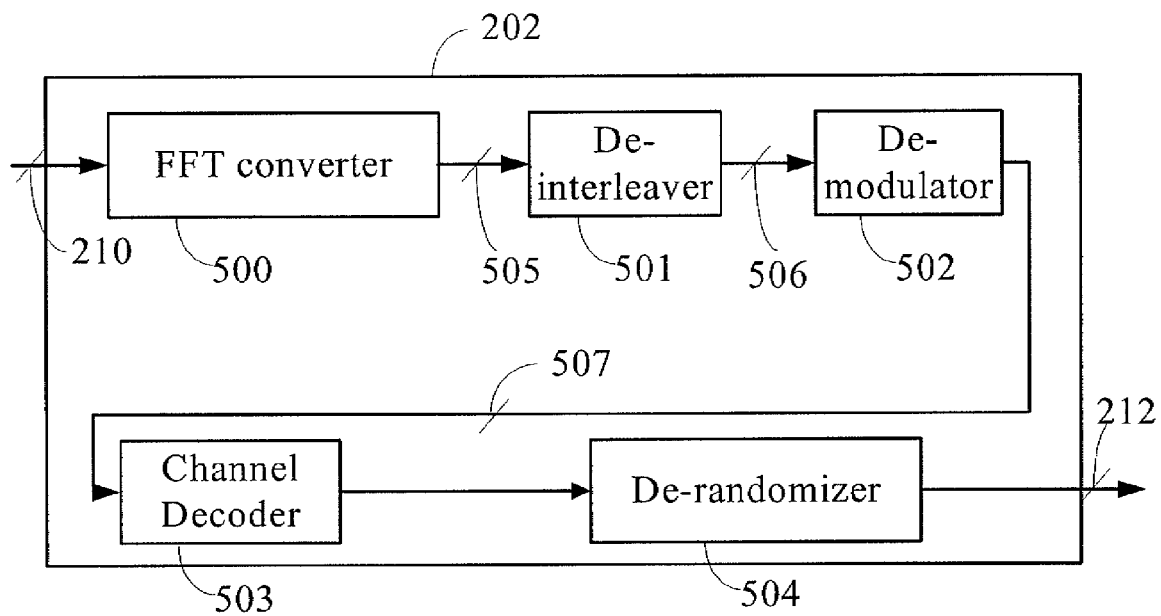
FIG. 5 is a diagram of a first converter of a first embodiment of the invention.

As shown in FIG. 5, the first converter 202 comprises a fast Fourier transformer (FFT) converter 500, a de-interleaver 501, a de-modulator 502, a channel encoder 503 and a de-randomizer 504. The FFT converter 500 may be a conventional FFT converter adapted for the WiMAX wireless network to perform a fast Fourier transformation to generate a fast Fourier signal 505 after receiving the digital signal 210. The de-interleaver 501 may be a conventional de-interleaver adapted for the WiMAX wireless network to perform a de-interleaving operation to generate a de-interleaved signal 506. The de-modulator 502 may be a conventional de-modulator adapted for the WiMAX wireless network to generate a de-modulation signal 507 according to a predetermined de-modulation manner. Finally, the de-modulation signal 507 is sent to the channel decoder 503, a conventional channel decoder adapted for the WiMAX wireless network, to be decoded and then sent to the de-randomizer 504, a conventional de-randomizer adapted for the WiMAX wireless network, to be de-randomized to generate information 212 which is identifiable to a data link layer of the network. The de-modulation manner can be one or a combination of 16-Quadrature Amplitude Modulation, 64-Quadrature Amplitude Modulation, 256-Quadrature Amplitude Modulation, Binary Phase Shift Keying, and Quadrature Phase-Shift Keying.

Referring back to FIG. 2, the controller 203 receives the information 212 and retrieves a broadcast burst data 40, a download burst data 41 and an upload burst data 42 as shown in FIG. 4 from the information 212. More specifically, in this embodiment the broadcast burst data 40 comprises the content of time division duplex and gain control, the download burst data 41 comprises the content of the gain control as well, and the upload burst data 42 comprises a content of signal quality. The controller 203 retrieves the content of time division duplex, gain control and signal quality to determine the quality of the wireless signal 209. The controller 203 combines the retrieved content to form a control signal 213. Specifically speaking, the controller 203 may be a media access control unit of the data link layer of the network.

According to the gain control content in the control signal 213, the adjuster 205 generates a gain adjustment signal 214 which is well-known to those skilled in the art. The amplifier 206 adjusts a gain for amplifying the transmission signal 211 according to the gain adjustment signal 214 to analogizes the transmission signal 211 to generate an amplified transmission signal 215. The transmitter 207 transmits the amplified transmission signal 215 via the antenna 216. To transmit the amplified transmission signal 215, the first switch 204 switches the transmission and receiving modes of the receiver 200 and the transmitter 207 according to the content of time division duplex in the control signal 213. For example, while the content of time division duplex in the control signal 213 indicates it is time for receiving a signal, the first switch 204 switches the antenna 208 to the receiver 200 for receiving the signal. While the content of time division duplex in the control signal 213 indicates it is time for transmitting a signal, the first switch 204 switches the antenna 216 to the transmitter 207 for transmitting the signal.

The path within the signal relay apparatus 2 for the wireless signal 209 is through the receiver 200, the filter 201, the amplifier 206 and the transmitter 207. The first converter 202, the controller 203, the first switch 204 and the adjuster 205 are configured to determine how to adjust the gain for amplifying the transmission signal 211 and how to control the operation of the receiver 200 and the transmitter 207 according to a receiving status of the wireless signal 209.

Figure 6:
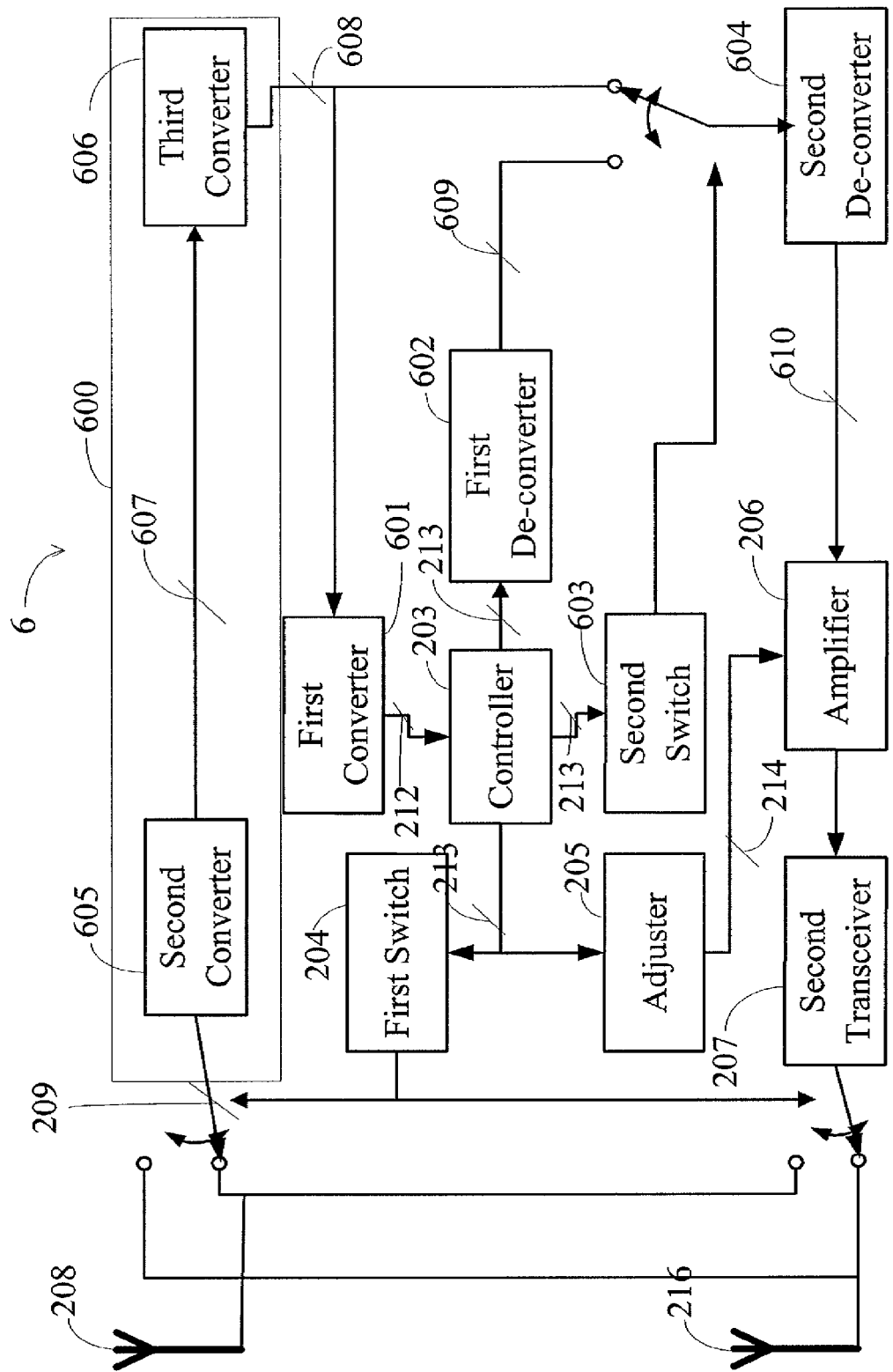
FIG. 6 is a diagram of a second embodiment of the invention.

FIG. 6 depicts a second embodiment of the invention which shows a signal relay apparatus 6 adapted for the WiMAX wireless network. The signal relay apparatus 6 comprises a receiver (a transceiver in a receiving mode) 600, a first converter 601, a controller 203, an adjuster 205, a first de-converter 602, a second switch 603, a second de-converter 604, an amplifier 206, a transmitter (a transceiver in a transmission mode) 207, a first switch 204, an antenna 208 and an antenna 216. The receiver 600 comprises a second converter 605 and a third converter 606. The second converter 605 receives a wireless signal 209 via the antenna 208 and digitizes it to generate an initial digital signal 607. The third converter 606 comprises the FFT converter 500 and the de-modulator 502 of the first embodiment to perform digital waveform construction and noise elimination to generate a digital signal 608.

Figure 7:
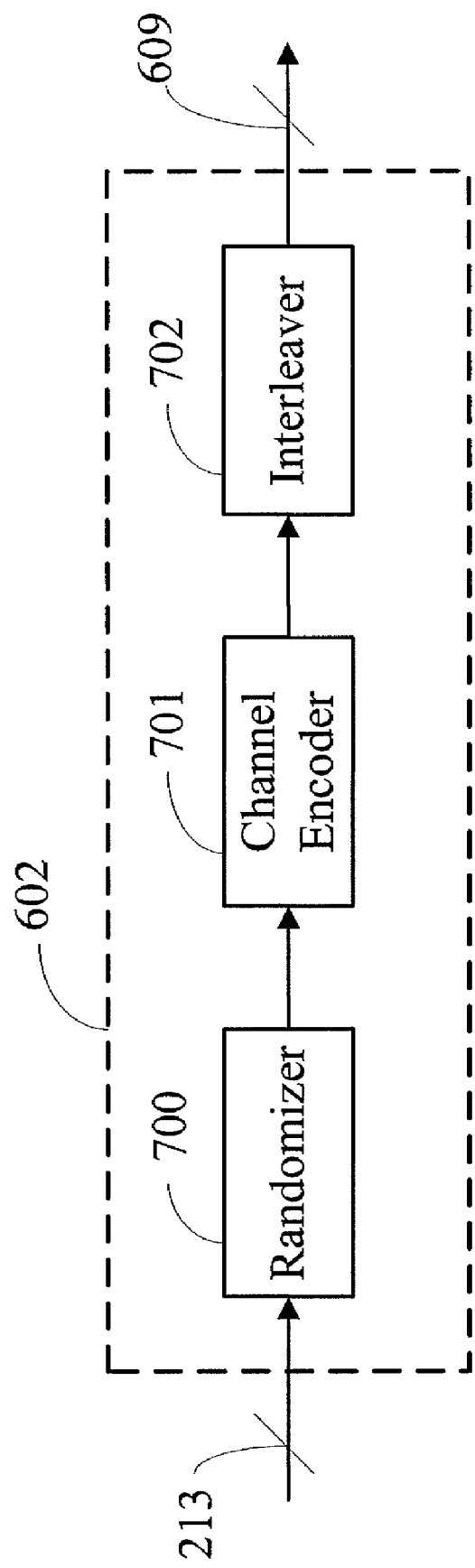
FIG. 7 is a diagram of a first de-converter of a second embodiment of the invention.
Figure 8:
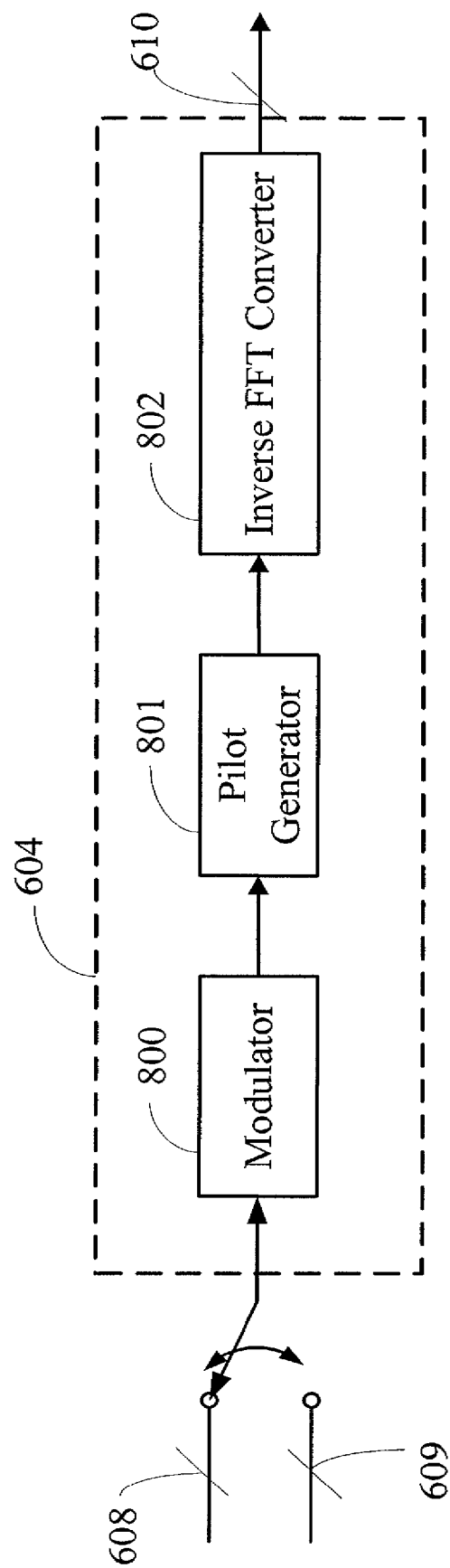
FIG. 8 is a diagram of a second converter of a second embodiment of the invention.

The first converter 601 comprises the de-interleaver 501, the channel decoder 503 and the de-randomizer 504 of the first embodiment to convert the digital signal 608 into information 212. The controller 203 receives the information 212 and retrieves the broadcast burst data 40, the download burst data 41, and the upload burst data 42. As shown in FIG. 7, the first de-converter 602 comprises a randomizer 700, a channel encoder 701 and an interleaver 702. After respectively performing a randomization, a coding and an interleaving processing by the randomizer 700, the channel encoder 701 and the interleaver 702, the control signal 213 is transformed to a report signal 609. Specifically speaking, the report signal 609 represents the signal quality of the wireless signal 209. The second switch 603 selects one of the digital signal 608 and the report signal 609 to be sent to the second de-converter 604 according to the control signal 213. As shown in FIG. 8, the second de-converter 604 comprises a modulator 800, a pilot generator 801 and an inverse FFT converter 802. After either the digital signal 608 or the report signal 609 enters the second de-converter 604, the modulator 800, the pilot generator 801 and the inverse FFT converter 802 respectively processes modulation, generates a pilot signal and performs inverse fast Fourier transformation to generate a transmission signal 610. The transmission signal 610 is then amplified, analogized, and transmitted by the amplifier 206 and the transmitter 207.

In the second embodiment, the second switch 603 operates according to the content of time division duplex in the control signal 213. While the second switch 603 selects the digital signal 608 to be sent to the second de-converter 604, the path in the signal relay apparatus 6 for the wireless signal 209 is through the receiver 600, the second de-converter 604, the amplifier 206 and the transmitter 207. While the second switch 603 selects the report signal 609 to be sent to the second de-converter 604, the path in the signal relay apparatus 6 for the wireless signal 209 is through the receiver 600, the first converter 601, the controller 203, the first de-converter 602, the second de-converter 604, the amplifier 206 and the transmitter 207. In other words, the transmission time of the digital signal 608 and the report signal 609 is determined according to time division duplex.

Figure 9:
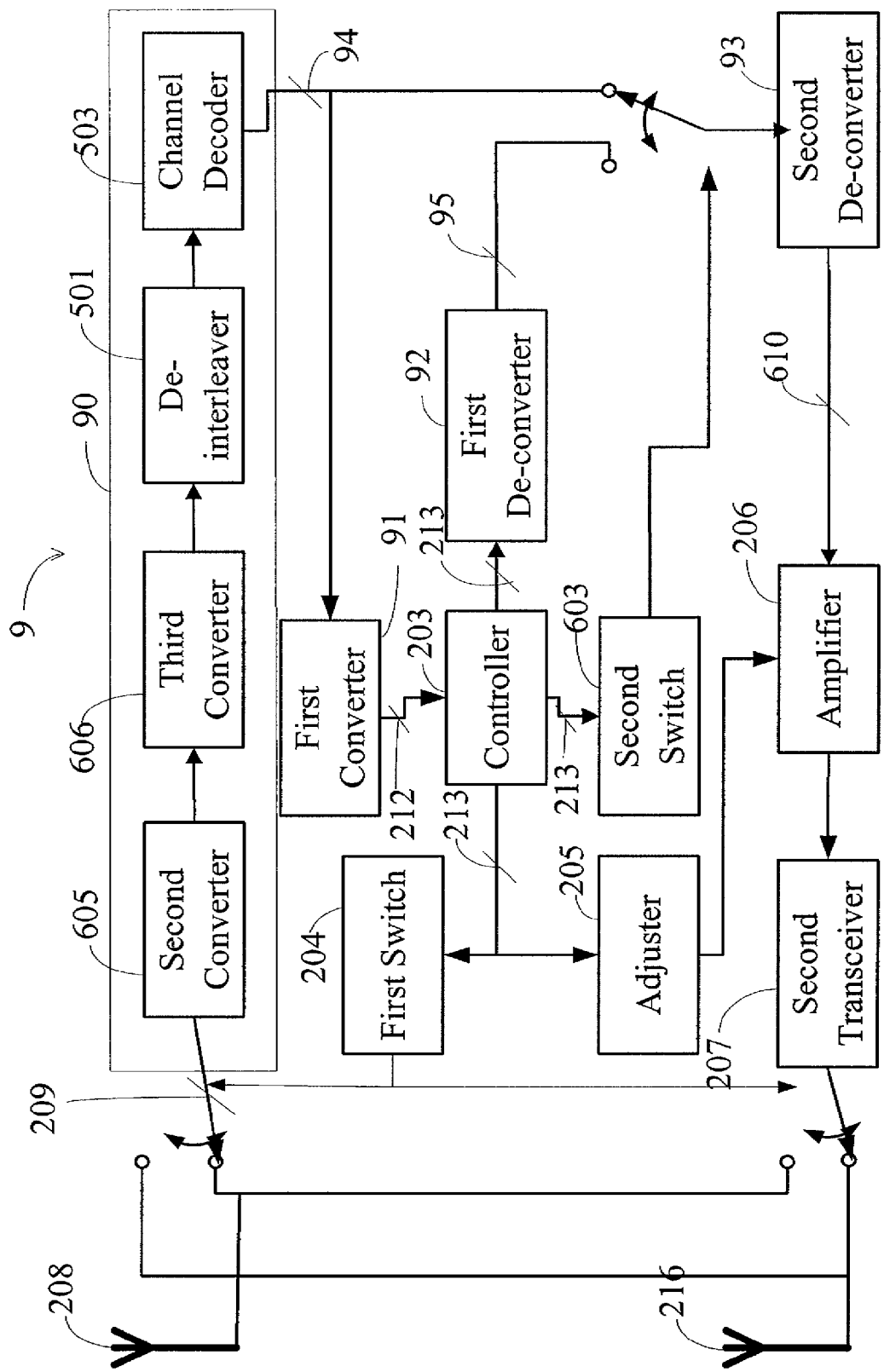
FIG. 9 is a diagram of a third embodiment of the invention.
Figure 10:
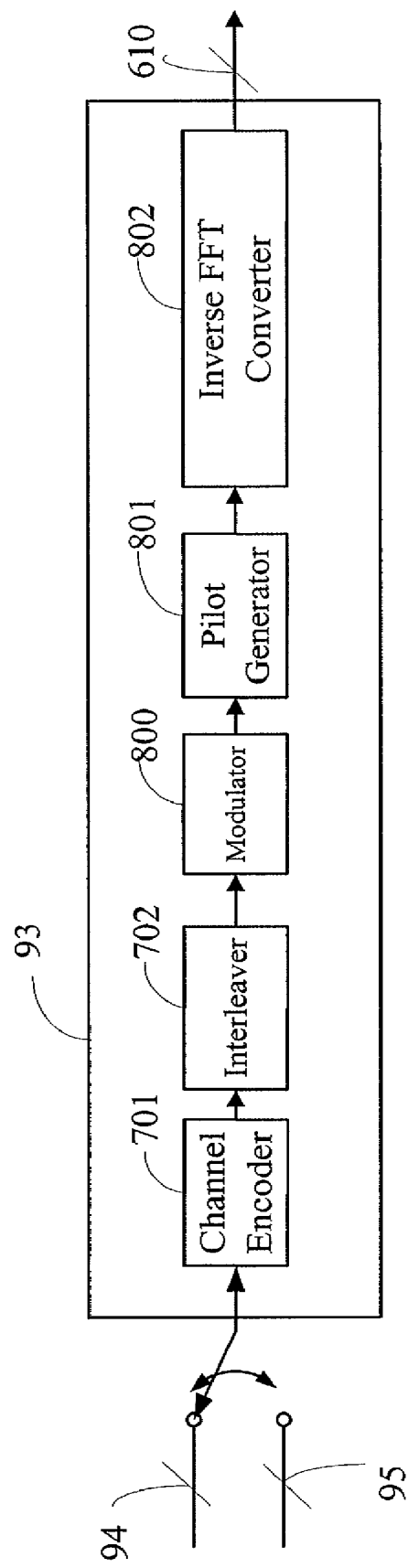
FIG. 10 is a diagram of a second de-converter of a third embodiment of the invention.

FIG. 9 depicts a third embodiment of the invention which shows a signal relay apparatus 9 adapted for the WiMAX wireless network. The third embodiment has a similar structure as the second embodiment. Only the differences will be described hereinafter. The third embodiment comprises a receiver (a transceiver in a receiving mode) 90, a first converter 91, a first de-converter 92 and a second de-converter 93. The receiver 90 comprising the second converter 605, the third converter 606, the de-interleaver 501 and the channel encoder 503 receives the wireless signal 209 via the antenna 208, performs digital waveform construction to eliminate interference due to noise, and eliminates data errors caused by the channel effect via the de-interleaver 501 and the channel decoder 503 to generate a decoded digital signal 94. The first converter 91 comprises the de-randomizer 504 only to convert the decoded digital signal 94 into the information 212. The first de-converter 92 de-converts the control signal 213 to generate a report signal 95, wherein the first de-converter 92 is the randomizer 700. As shown in FIG. 10, the second de-converter 93 comprises the channel encoder 701, the interleaver 702, the modulator 800, the pilot generator 801 and the inverse FFT converter 802. The second de-converter 93 performs the conversions on either the decoded digital signal 94 or the report signal 95 to generate the transmission signal 610. The transmission signal 610 is then amplified, analogized, and transmitted by the amplifier 206 and the transmitter 207.

In the third embodiment, the second switch 603 operates according to the content of time division duplex in the control signal 213. While the second switch 603 selects the digital signal 94 to be inputted to the second de-converter 93, a path in the signal relay apparatus 9 for the wireless signal 209 is through the receiver 90, the second de-converter 93, the amplifier 206 and the transmitter 207. While the second switch 603 selects the report signal 95 to be inputted to the second de-converter 93, a path in the signal relay apparatus 9 for the wireless signal 209 is through the receiver 90, the first converter 91, the controller 203, the first de-converter 92, the second de-converter 93, the amplifier 206 and the transmitter 207. In other words, the transmission time of the digital signal 94 and the report signal 95 is determined according to time division duplex.

Figure 11:
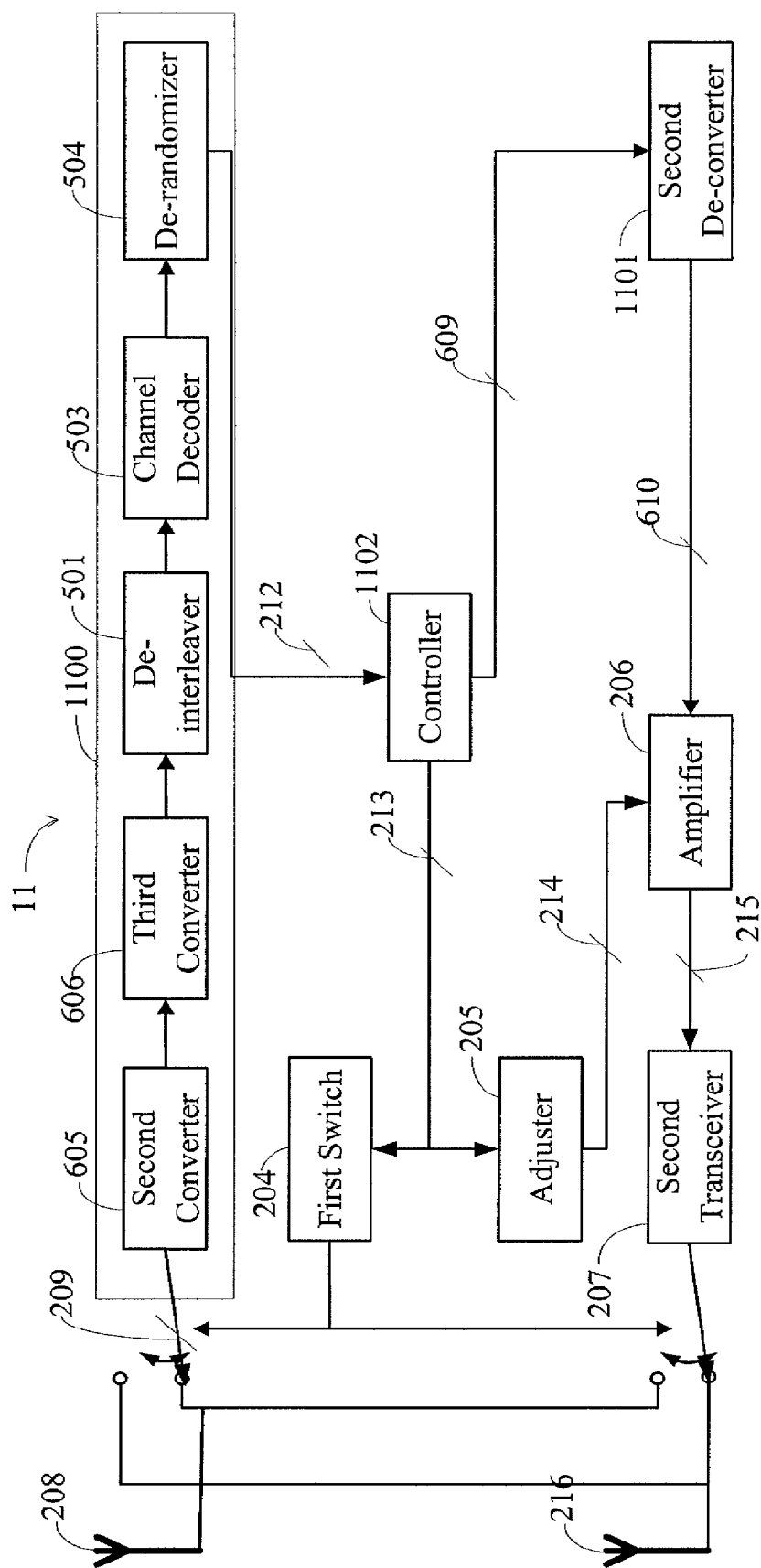
FIG. 11 is a diagram of a fourth embodiment of the invention.
Figure 12:
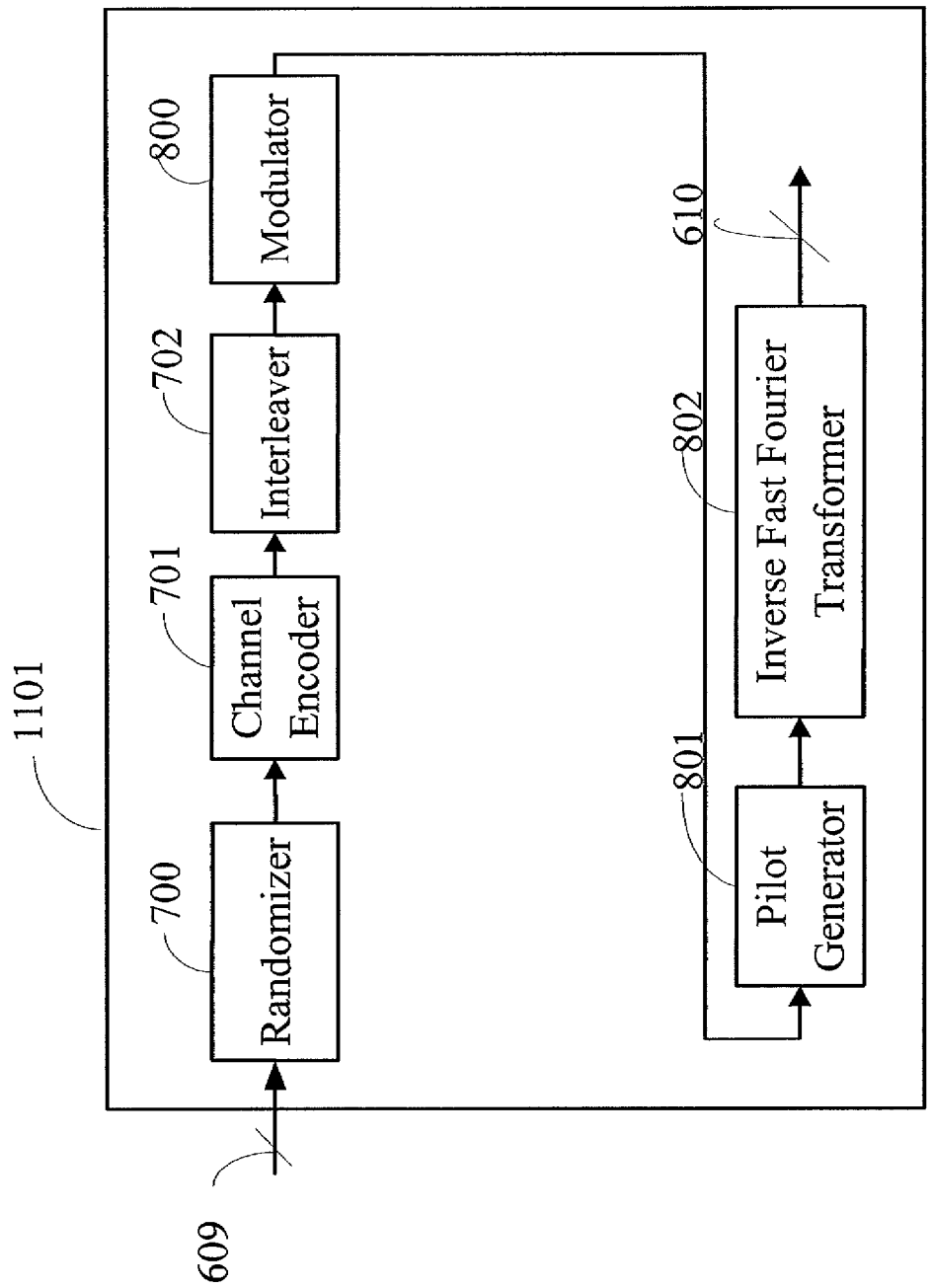
FIG. 12 is a diagram of a second de-converter of a fourth embodiment of the invention.

FIG. 11 depicts a fourth embodiment of the invention which is a signal relay apparatus 11 adapted for the WiMAX wireless network. This embodiment has a similar structure as the third embodiment and only the differences are described hereinafter. The fourth embodiment comprises a receiver (a transceiver in a receiving mode) 1100, a controller 1102 and a second de-converter 1101. In contrast with the receiver 90 of the third embodiment, the receiver 1100 further comprises the de-randomizer 504. Therefore, the receiver 1100 receives the wireless signal 209 via the antenna 208, performs digital waveform construction to eliminate interference due to noise, eliminates data errors caused by the channel effect via the de-interleaver 501 and the channel decoder 503, and supports different transmission modes, such as a relay link and a access link, because of the newly added de-randomizer 504 to generate the information 212. The controller 1102 further comprises a second switch 603 to generate the control signal 213 and the report signal 609 according to the information 212. As shown in FIG. 12, the second de-converter 1101 comprises the randomizer 700, the channel encoder 701, the interleaver 702, the modulator 800, the pilot generator 801 and the inverse FFT converter 802. The second de-converter 1101 de-converts the report signal 609 to the transmission signal 610. The transmission signal 610 is then amplified, analogized, and transmitted by the amplifier 206 and the transmitter 207.

In the fourth embodiment, a path in the signal relay apparatus 11 for the wireless signal 209 is through the receiver 1100, the controller 1102, the second de-converter 1101, the amplifier 206 and the transmitter 207. The first switch 204 and the adjuster 205 are configured to determine how to adjust the gain for amplifying the transmission signal 609 and how to control the operation of the receiver 1100 and the transmitter 207 according to a receiving status of the wireless signal 209.

Figure 13:
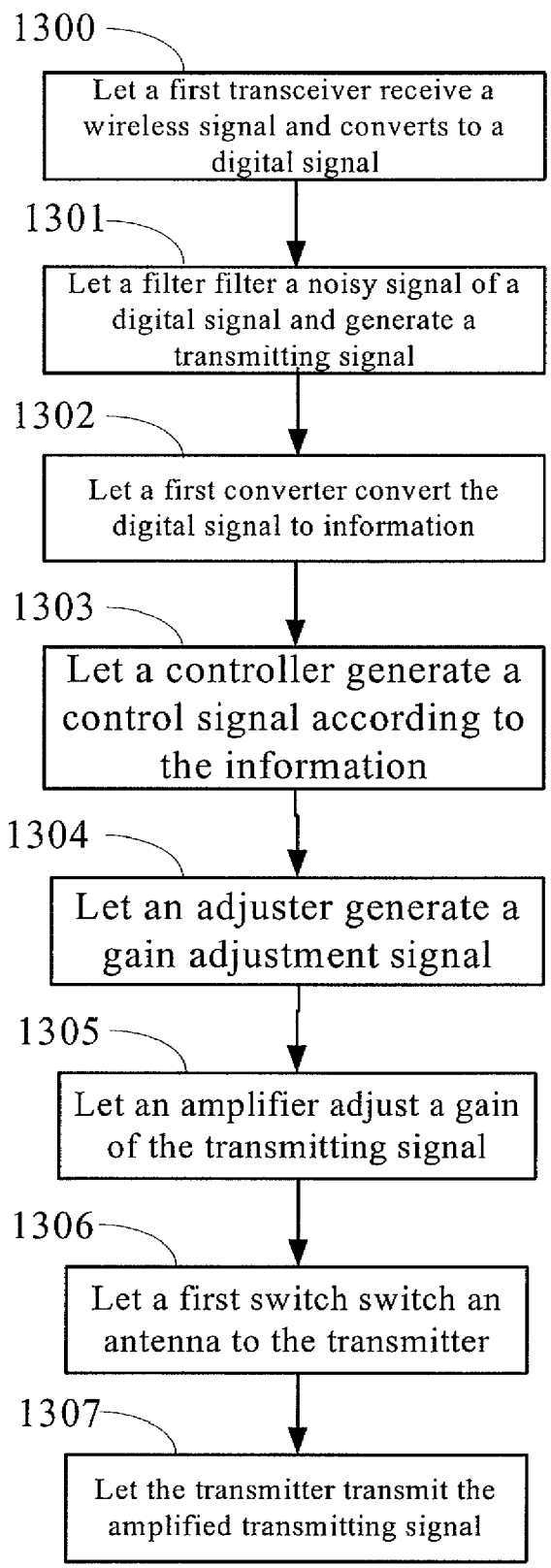
FIG. 13 is a flow chart of a fifth embodiment of the invention.
Figure 14:
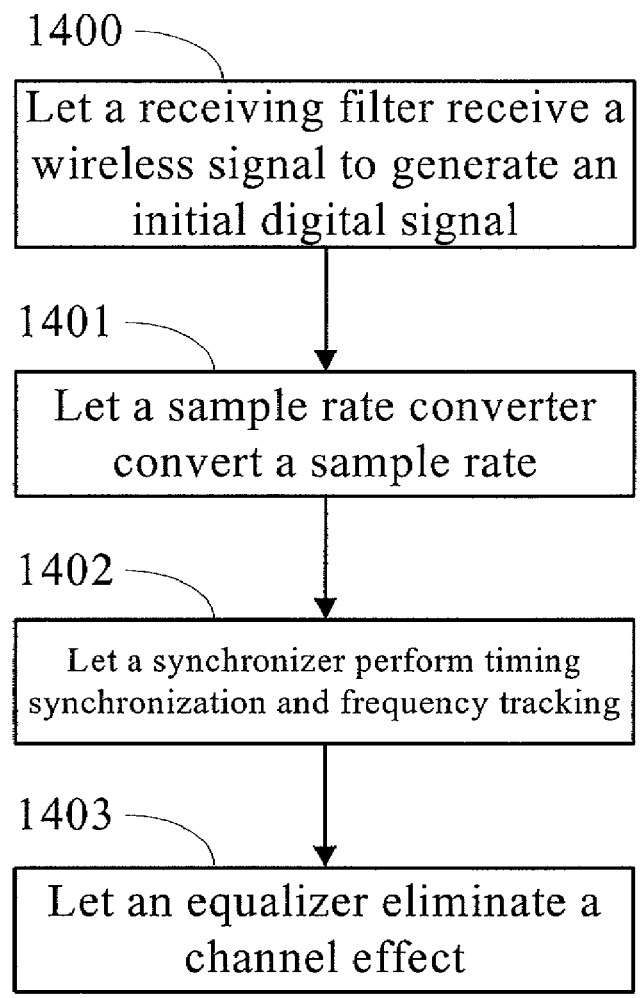
FIG. 14 is a flow chart of step 1300 of a fifth embodiment of the invention.

FIG. 13 depicts a fifth embodiment of the invention which shows a flow chart of a signal relay method adapted for a WiMAX wireless network. The method is applied to the signal relay apparatus 2 as described in the first embodiment. In the first step 1300, the first transceiver receives the wireless signal 209 via the antenna 208 to generate a digital signal 210. For a more detailed description, step 1300 further comprises steps as shown in FIG. 14. In step 1400, the receiving filter 300 receives the wireless signal 209 from the antenna 208 to filter and convert into the initial digital signal 304. In next step 1401, the sample rate converter 301 performs the sample rate conversion on the initial digital signal 304 to generate the initial digital signal with adjusted sample rate 305. In next step 1402, the synchronizer 302 performs timing synchronization and frequency tracking on the initial digital signal 305 to generate the synchronized signal 306. In final step 1403, the timing equalizer 303 generates the digital signal 210 after eliminating the channel effect of the synchronized signal 306. Now back to FIG. 13, in step 1301 the filter 201 filters the noise of the digital signal 210 to generate the transmission signal 211.

Figure 15:
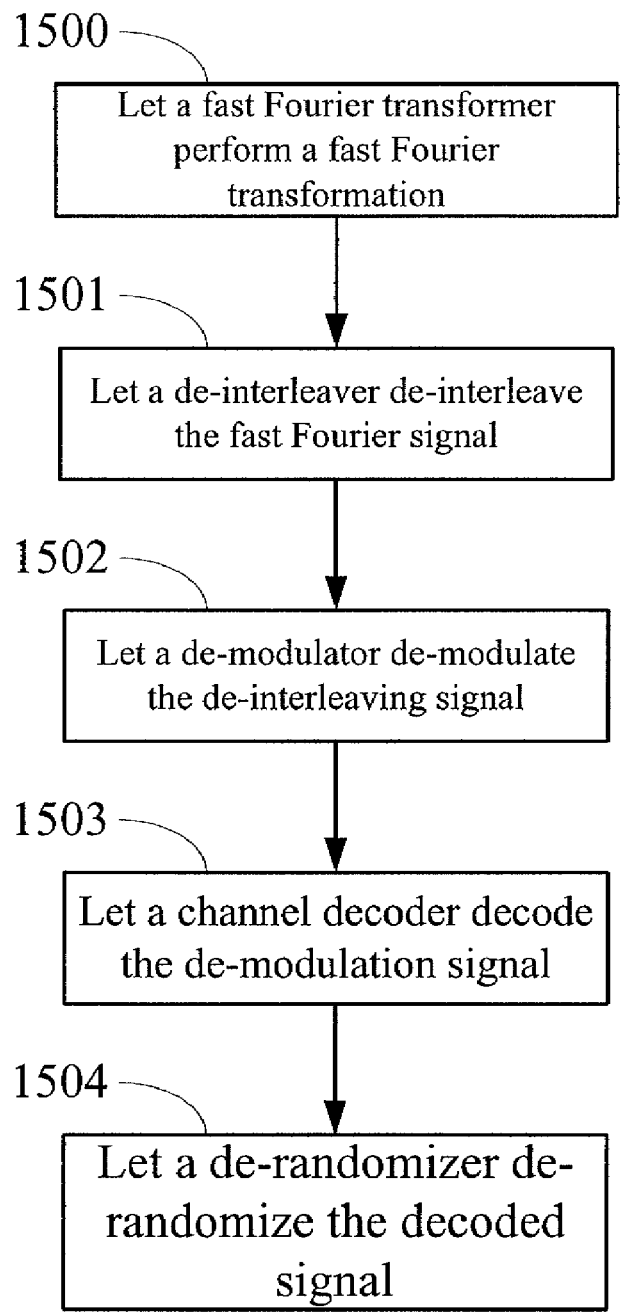
FIG. 15 is a flow chart of step 1302 of a fifth embodiment of the invention.

In step 1302, the first converter 202 converts the digital signal 210 into the information 212. For a more detailed description, step 1301 further comprises steps as shown in FIG. 15. In first step 1500, the FFT converter 500 performs the fast Fourier transformation to generate the fast Fourier signal 505 after receiving the digital signal 210. In next step 1501, the de-interleaver 501 de-interleaves the fast Fourier signal 505 to generate the de-interleaved signal 506. In step 1502, the de-modulator 502 performs de-modulation according to the pre-determined manner to generate the de-modulation signal 507. In final steps 1503 and 1504, the channel decoder 503 and the de-randomizer 504 performs decoding and de-randomizing to generate the information 212 respectively.

Back to FIG. 13, in step 1303 the controller 203 receives the information 212 to generate the control signal 213. In step 1304, the adjuster 205 is configured to generate the gain adjustment signal 214 according to the gain control content of the control signal 213. In step 1305, the amplifier 207 adjusts the gain of the transmission signal 211 according to the gain adjustment signal 214 and analogizes the transmission signal 211 to generate the amplified transmission signal 215. In step 1306, the first switch 204 switches the transmission and receiving modes of the receiver 200 and the transmitter 207 according to the content of time division duplex in the control signal 213. In step 1307, the transmitter 207 transmits the amplified transmission signal 215 via the antenna 216.

Except mentioned steps, the fifth embodiment can further execute operation and method described in the first embodiment.

Figure 16:
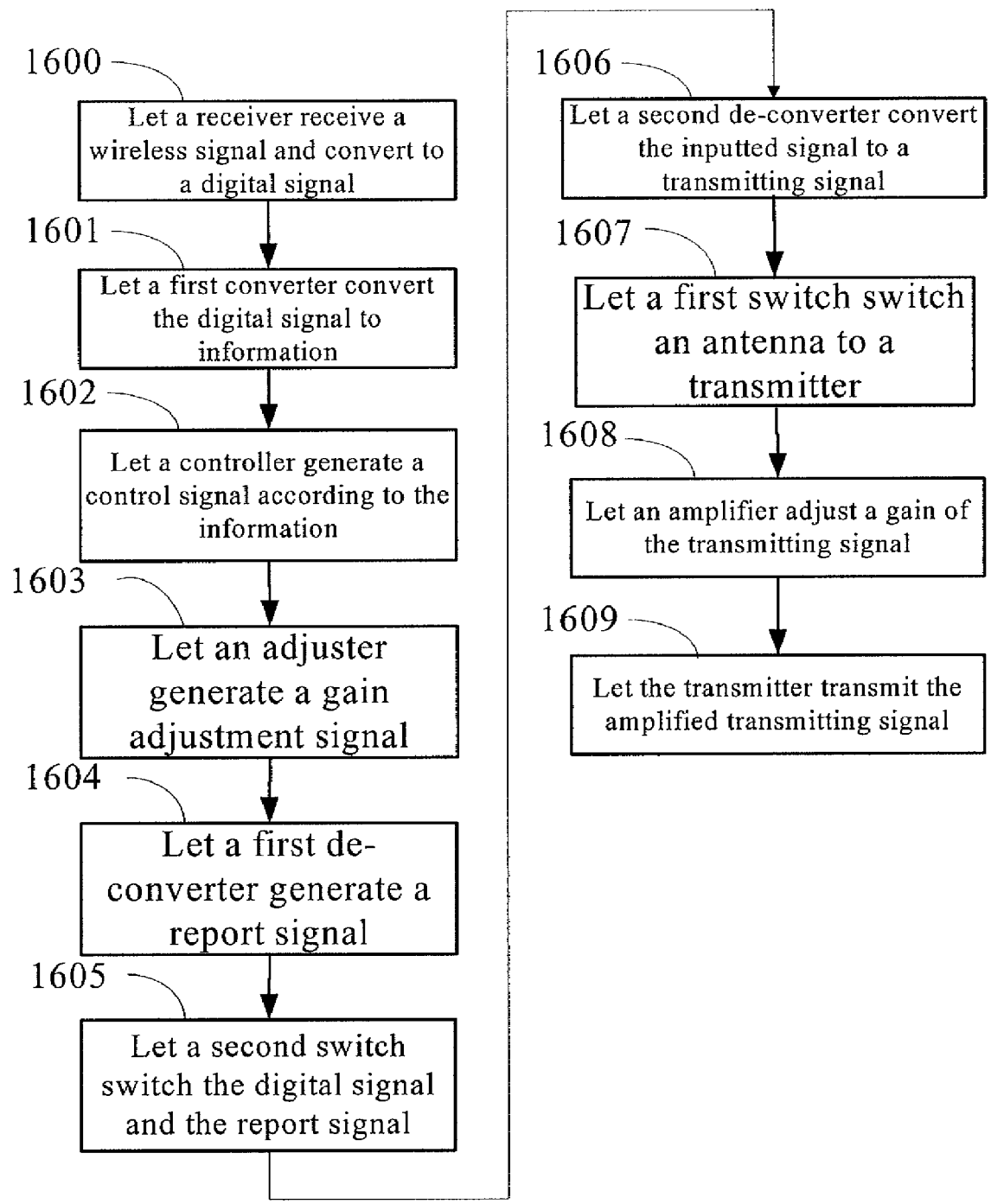
FIG. 16 is a flow chart of a sixth embodiment of the invention.
Figure 17:
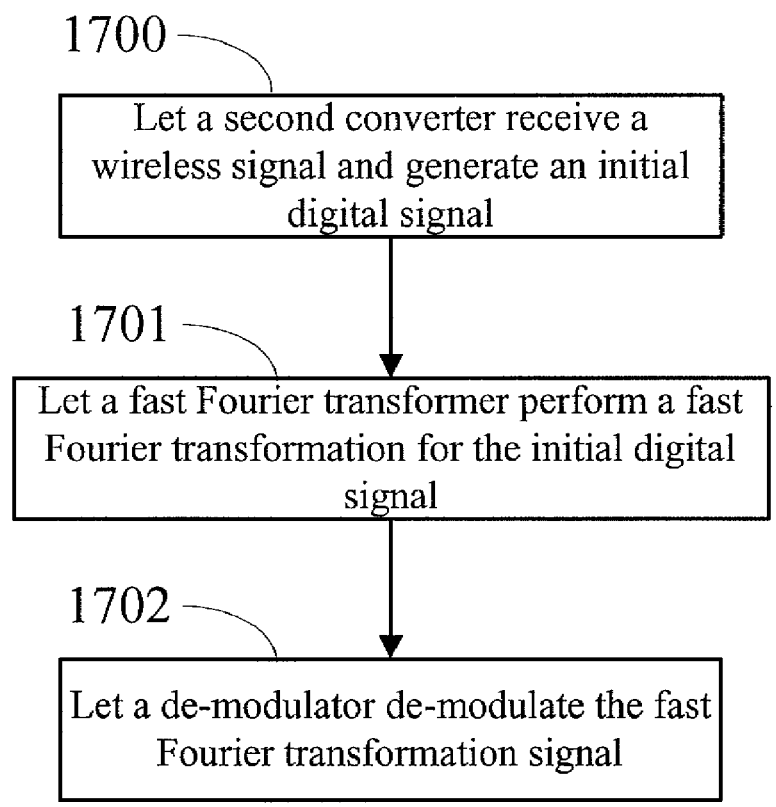
FIG. 17 is a flow chart of step 1600 of a sixth embodiment of the invention.

FIG. 16 depicts a sixth embodiment of the invention which shows a flow chart of a signal relay method adapted for the WiMAX wireless network. The method is applied to the signal relay apparatus 6 as described in the second embodiment. In the first step 1600, the receiver 600 receives the wireless signal 209 via the antenna 208 and converts the wireless signal 209 into the digital signal 608, wherein the receiver 600 further comprises the second converter 605 and the third converter 606. The third converter 606 further comprises the FFT converter 500 and the de-modulator 502 as shown in the first embodiment. Consequently, step 1600 further comprises steps as shown in FIG. 17. In first step 1700, the second converter 605 receives, filters and converts the wireless signal 209 to the initial digital signal 607. In next step 1701, the FFT converter 500 performs the fast Fourier transformation on the initial digital signal 607 to generate a fast Fourier transform signal. In next step 1702, the de-modulator 502 performs de-modulation on the fast Fourier transform signal to generate the digital signal 608.

Figure 18:
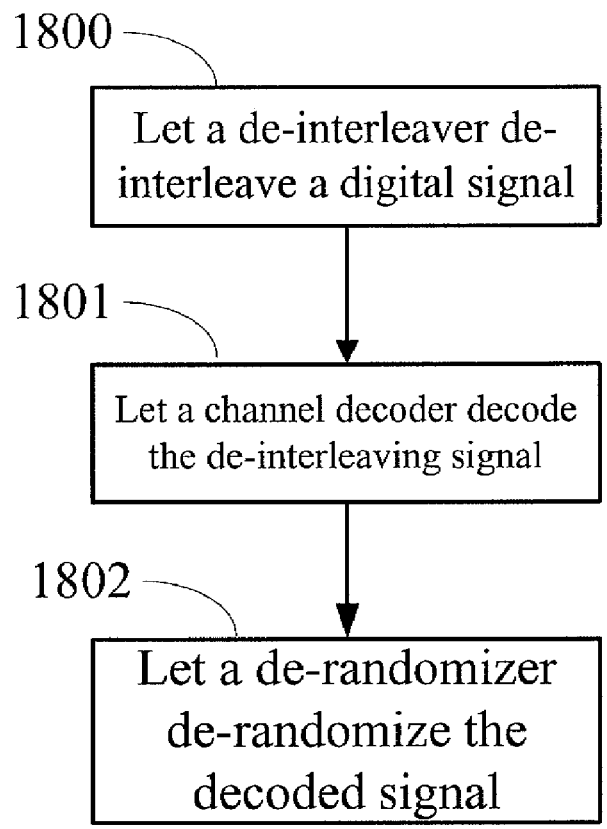
FIG. 18 is a flow chart of step 1601 of a sixth embodiment of the invention.
Figure 19:
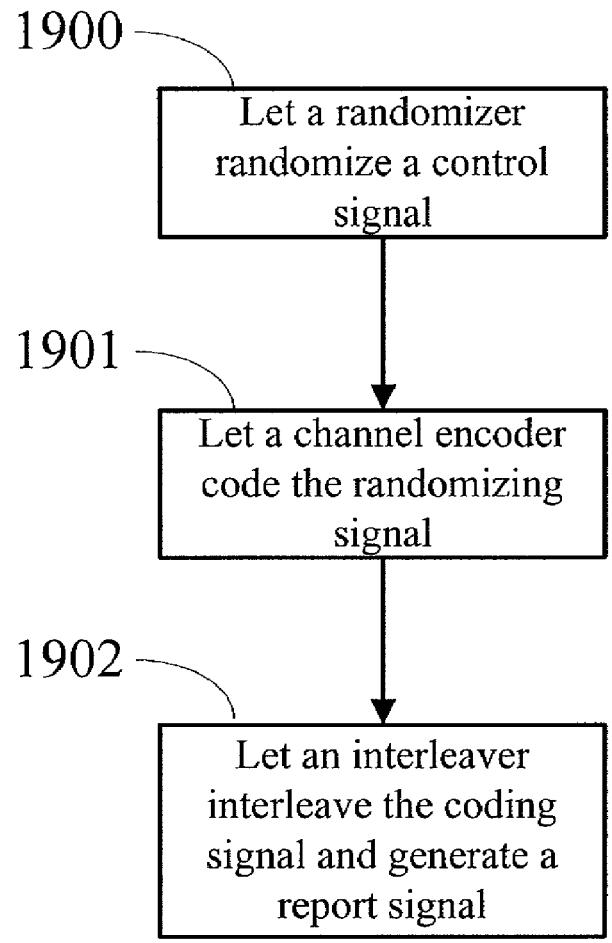
FIG. 19 is a flow chart of step 1604 of a sixth embodiment of the invention.

Back to FIG. 16 to execute step 1601, the first converter 601 converts the digital signal 608 into the information 212, wherein the first converter 601 comprises the de-interleaver 501, the channel decoder 503 and the de-randomizer 504 of the first embodiment. Consequently, step 1601 further comprises the steps shown in FIG. 18. In first step 1800, the de-interleaver de-interleaves the digital signal 608 to generate a de-interleaved signal. In next step 1801, the channel decoder 503 decodes the de-interleaved signal to generate a decoded signal. In final step 1802, the de-randomizer 504 performs de-randomizing on the decoded signal to generate the information 212. Back to FIG. 16 again, in step 1602 the controller 203 receives the information 212 and retrieves the broadcast burst data 40, the download burst data 41 and the upload burst data 42 of the packet format of the WiMAX wireless network 4 as shown in FIG. 4 to generate the control signal 213. In step 1603, the adjuster 205 is configured to generate the gain adjustment signal 214 according to the gain control content of the control signal 213. In next step 1604, the first de-converter 602 converts the control signal 213 to generate a report signal 609, wherein the first de-converter 602 further comprises the randomizer 700, the channel encoder 701 and the interleaver 702. Consequently, step 1604 further comprises the steps as shown in FIG. 19. In step 1900, the randomizer 700 randomizes the control signal 213 to generate a randomizing signal. In next step 1901, the channel encoder 701 performs coding on the randomizing signal to generate a coding signal. In final step 1902, the interleaver 702 interleaves the coding signal to generate a report signal 609. Specifically speaking, the report signal 609 represents for signal quality of the wireless signal 209.

Figure 20:
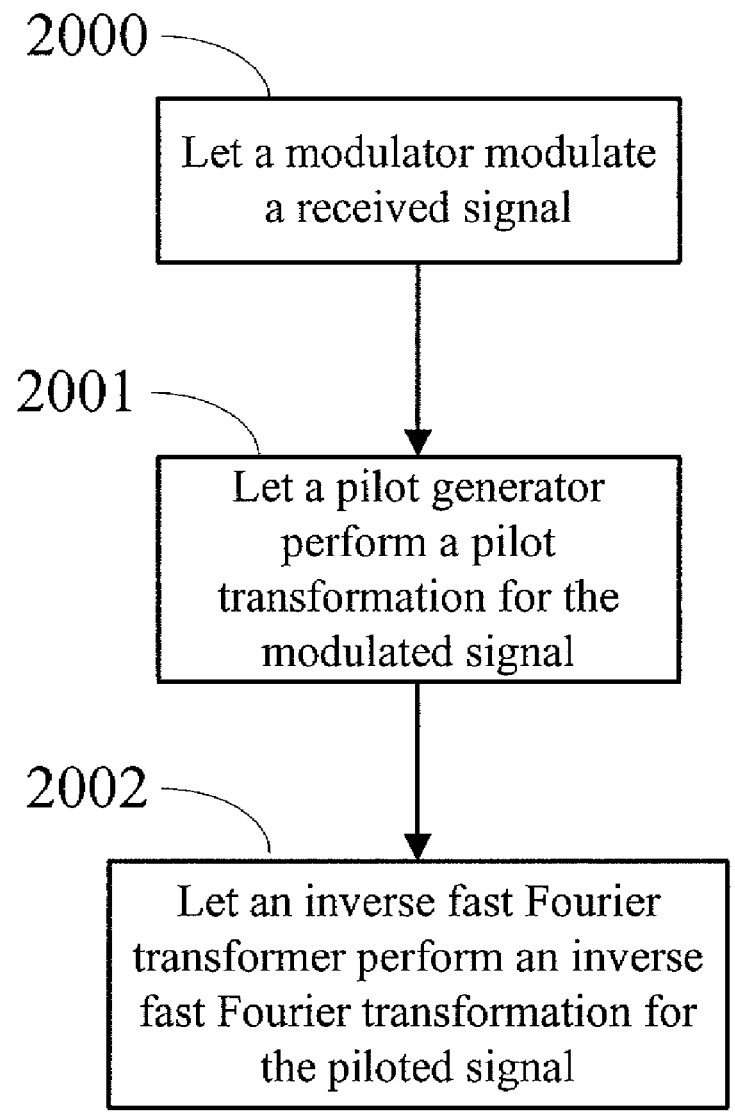
FIG. 20 is a flow chart of step 1606 of a sixth embodiment of the invention.

Back to FIG. 16 to execute step 1605, the second switch 603 switches one of the digital signal 608 and the report signal 609 to the input of the second de-converter 604 according to the control signal 213. In next step 1606, the second de-converter 604 converts the inputted signal to generate the transmission signal 610, wherein the second de-converter 604 further comprises the modulator 800, the pilot generator 801 and the inverse FFT converter 802. For a more detailed description, step 1606 further comprises the steps shown in FIG. 20. In steps 2000, 2001, 2002, the modulator 800, the pilot generator 801 and the inverse FFT converter 802 processes modulating, generates a pilot signal and performs inverse fast Fourier transformation to generate a transmission signal 610 respectively. In step 1307, the first switch 204 switches the transmission and receiving modes of the receiver 600 and the transmitter 207 according to the content of time division duplex in the control signal 213. In final step 1308 and step 1309, the amplifier 206 and the transmitter 207 amplifies, analogizes, and transmits the transmission signal 610 respectively.

Except mentioned steps, the sixth embodiment can further execute operation and method described in the second embodiment.

Figure 21:
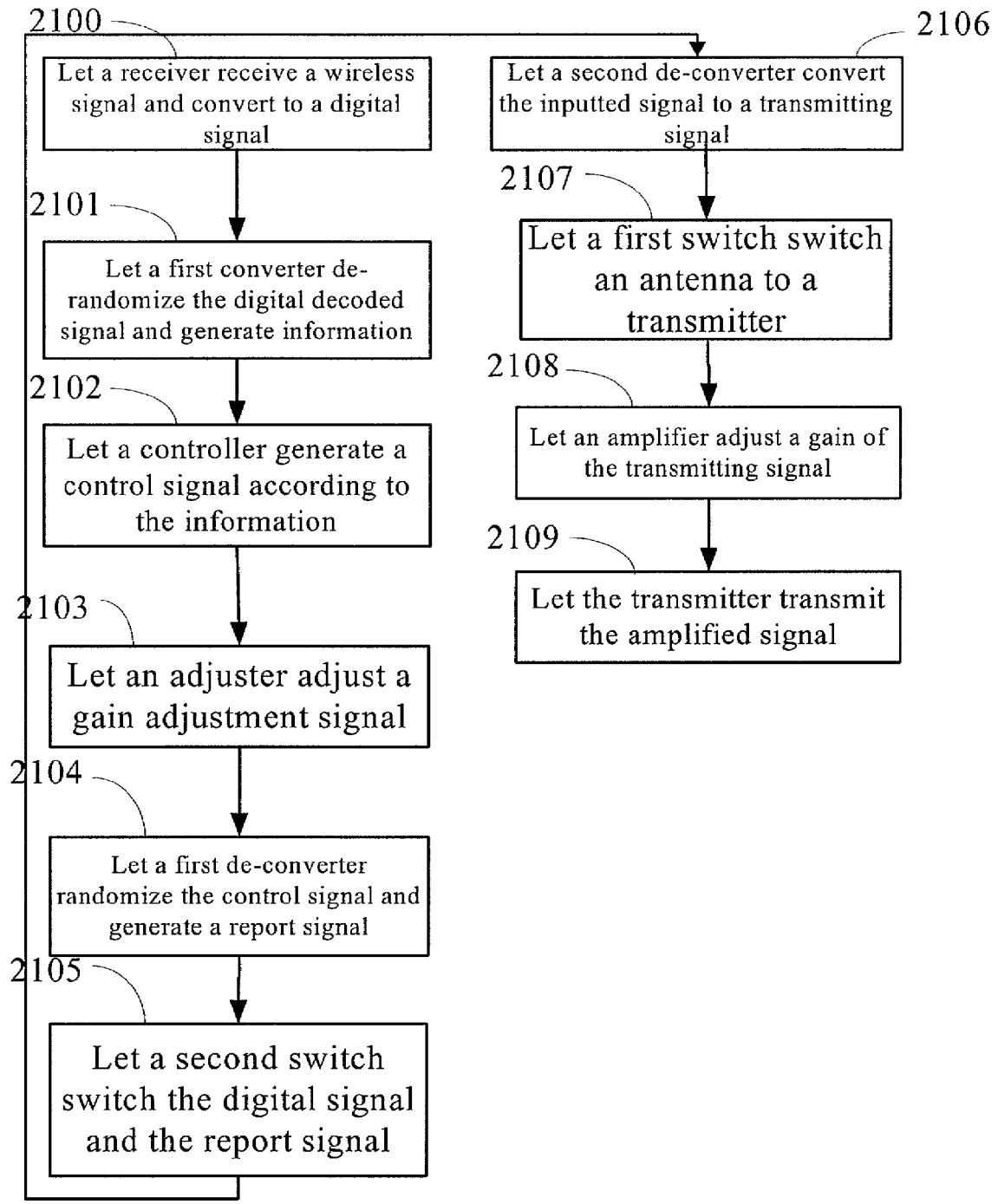
FIG. 21 is a flow chart of a seventh embodiment of the invention.
Figure 22:
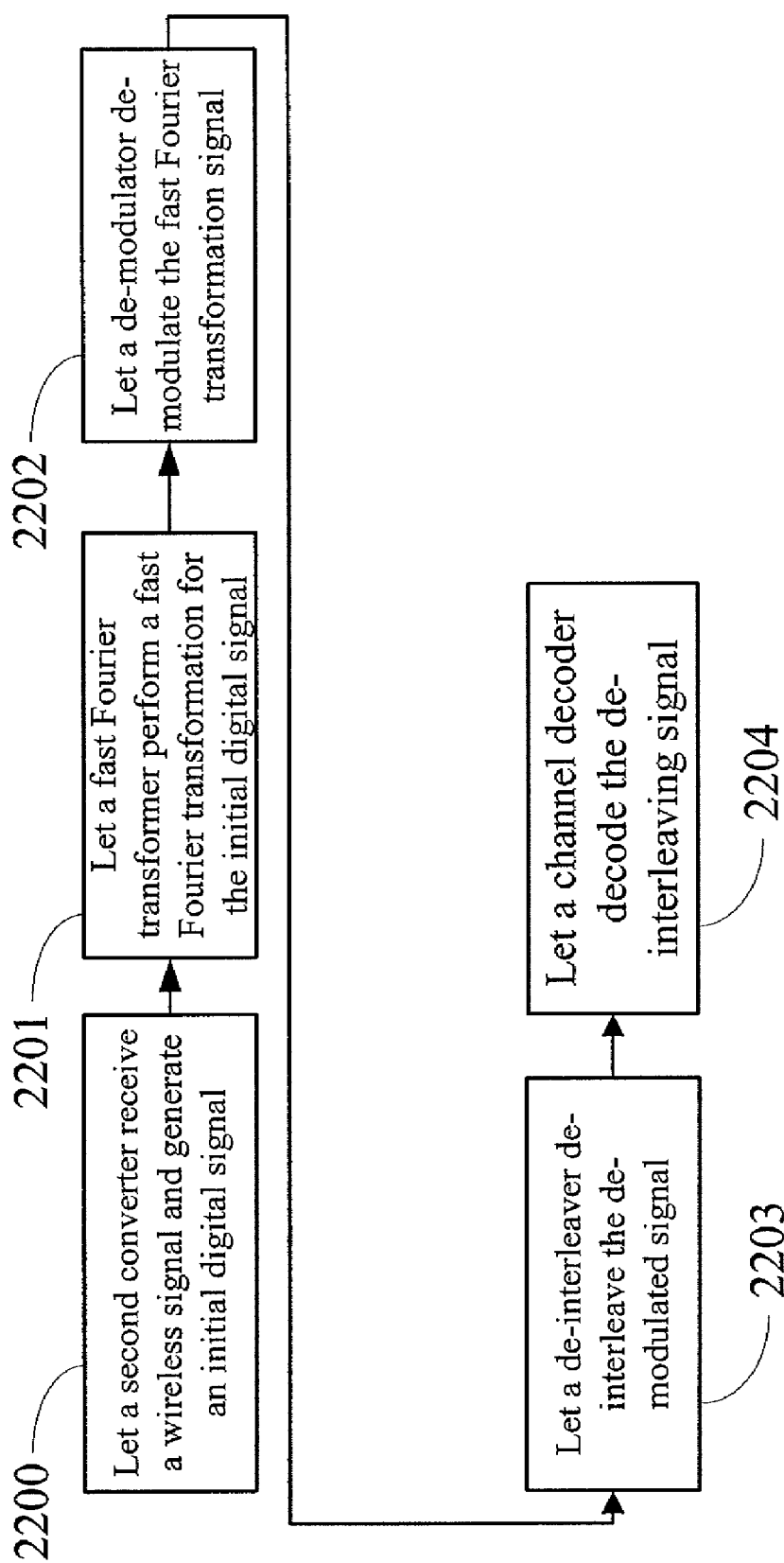
FIG. 22 is a flow chart of step 2100 of a seventh embodiment of the invention.
Figure 23:
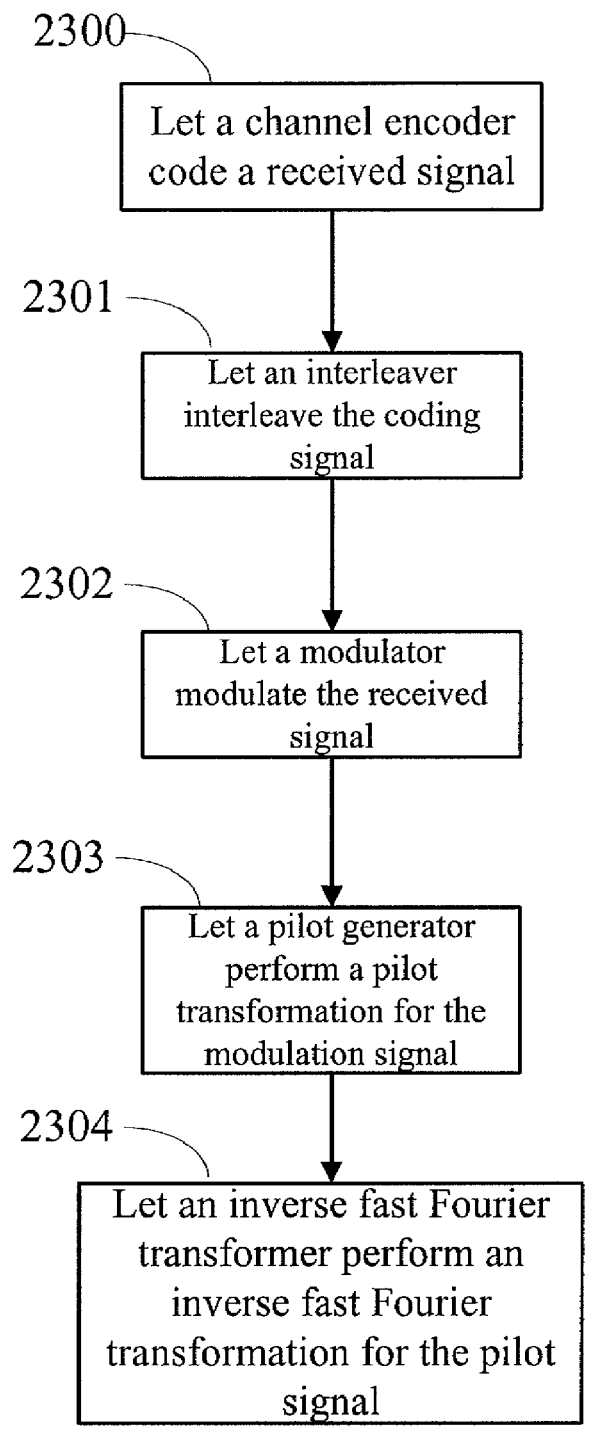
FIG. 23 is a flow chart of step 2106 of a seventh embodiment of the invention.

FIG. 21 depicts a seventh embodiment of the invention which shows a flow chart of a signal relay method adapted for a WiMAX wireless network. The method is applied to the signal relay apparatus 9 as described in the third embodiment. In the first step 2100, the receiver 90 receives the wireless signal 209 and generates the decoded digital signal 94, wherein the receiver 90 further comprises the second converter 605, the third converter 606, the de-interleaver 501 and the channel decoder 503. For a more detailed description, step 2100 further comprises the steps as shown in FIG. 22, wherein steps 2200, 2201 and 2202 are the same as steps 1700, 1701, and 1702 of the sixth embodiment and thus no unnecessary details are given here. In steps 2203 and 2204, the de-interleaver 501 de-interleaves the de-modulation signal and the channel decoder 503 eliminates data errors caused by the channel effect to generate the decoded digital signal 94. In step 2101, the first converter 91 converts the decoded digital signal 94 to generate the information 212, wherein the first converter 91 is indeed the de-randomizer 504. In next step 2102, the controller 203 receives the information 212 to generate the control signal 213. In step 2103, the adjuster 205 is configured to generate the gain adjustment signal 214 according to the gain control content of the control signal 213. In step 2104, the first de-converter 92 de-converts the control signal 213 to generate the report signal 95, wherein the first de-converter 92 is indeed the randomizer 700. In step 2105, the second switch 603 also switches one of the digital signal 94 and the report signal 95 to the input of the second de-converter 93 according to the control signal 213. In step 2106, the second de-converter 93 converts either the digital decoded signal 94 or the report signal 95 to generate the transmission signal 610, wherein the second de-converter 93 comprises the channel encoder 701, the interleaver 702, the modulator 800, the pilot generator 801 and the inverse FFT converter 802. For a more detailed description, step 2106 further comprises steps as shown in FIG. 23. In first step 2300 and step 2301, the channel encoder 701 and the interleaver 702 codes and interleaves the received signal to generate an interleaving signal respectively. The following steps 2302, 2303 and 2304 are the same as the steps 2000, 2001 and 2002 of the sixth embodiment and thus no unnecessary details are given here. In next step 2107, the first switch 204 switches the transmission and receiving modes of the receiver 90 and the transmitter 207 according to the content of time division duplex in the control signal 213. In final step 2108 and step 2109, the amplifier 206 and the transmitter 207 amplifies, analogizes, and transmits the transmission signal 610 respectively.

Except mentioned steps, the seventh embodiment can further execute operation and method described in the third embodiment.

Figure 24:
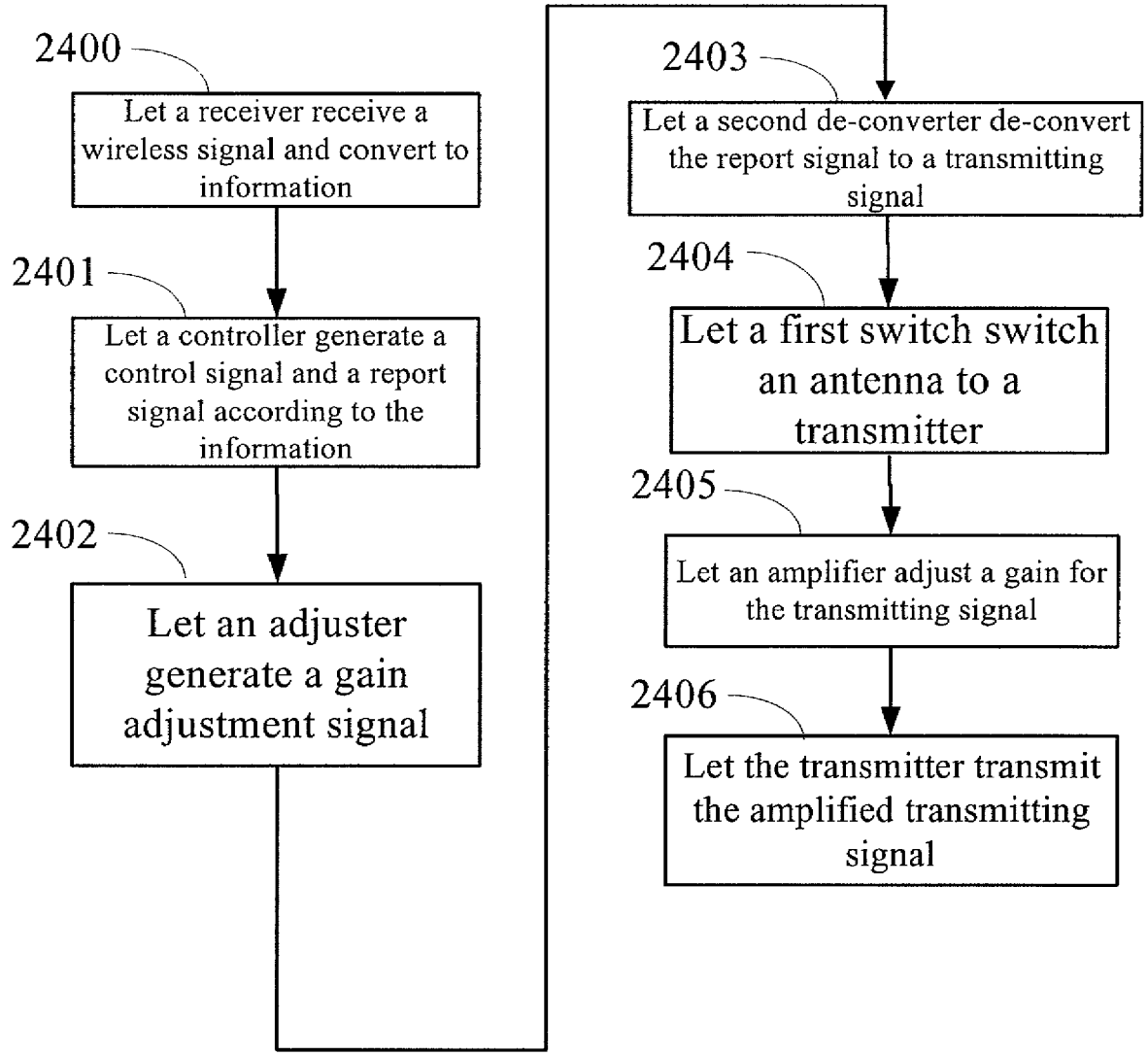
FIG. 24 is a flow chart of an eighth embodiment of the invention.
Figure 25:
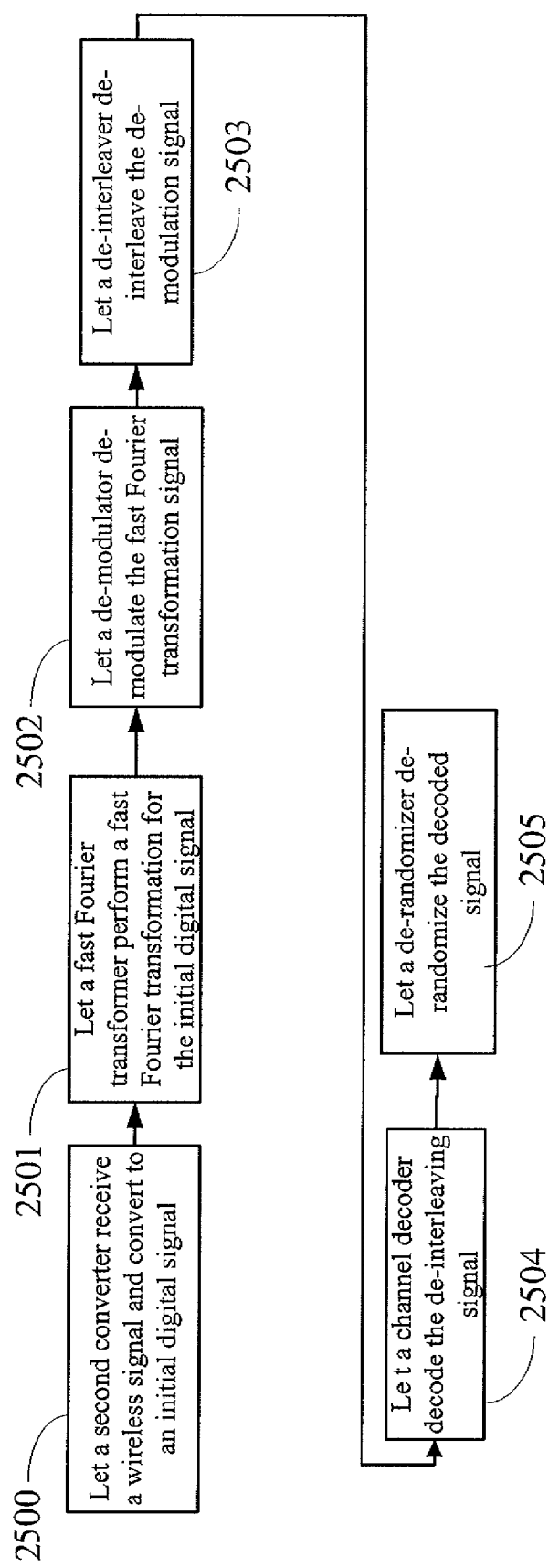
FIG. 25 is a flow chart of step 2400 of an eighth embodiment of the invention.

FIG. 24 depicts an eighth embodiment of the invention which shows a flow chart of a signal relay method adapted for a WiMAX wireless network. The method is applied to the signal relay apparatus 11 as described in the fourth embodiment. In the first step 2400, the receiver 1100 receives the wireless signal 209 and converts it to information 212. For a more detailed description, step 2400 further comprises the steps as shown in FIG. 25. In step 2500, the second converter 605 receives the wireless signal 209 to filter and convert to an initial digital signal. In next step 2501, the FFT converter 500 performs the fast Fourier transformation on the initial digital signal to generate a fast Fourier transform signal. In next step 2502, the de-modulator 502 de-modulates the fast Fourier transform signal. In next step 2503 and step 2504, the de-interleaver 501 de-interleaves the de-modulated signal and the channel decoder 503 eliminates data errors caused by the channel effect to generate a decoded signal. In step 2505, the de-randomizer 504 de-randomizes the decoded signal to generate the information 212.

Figure 26:
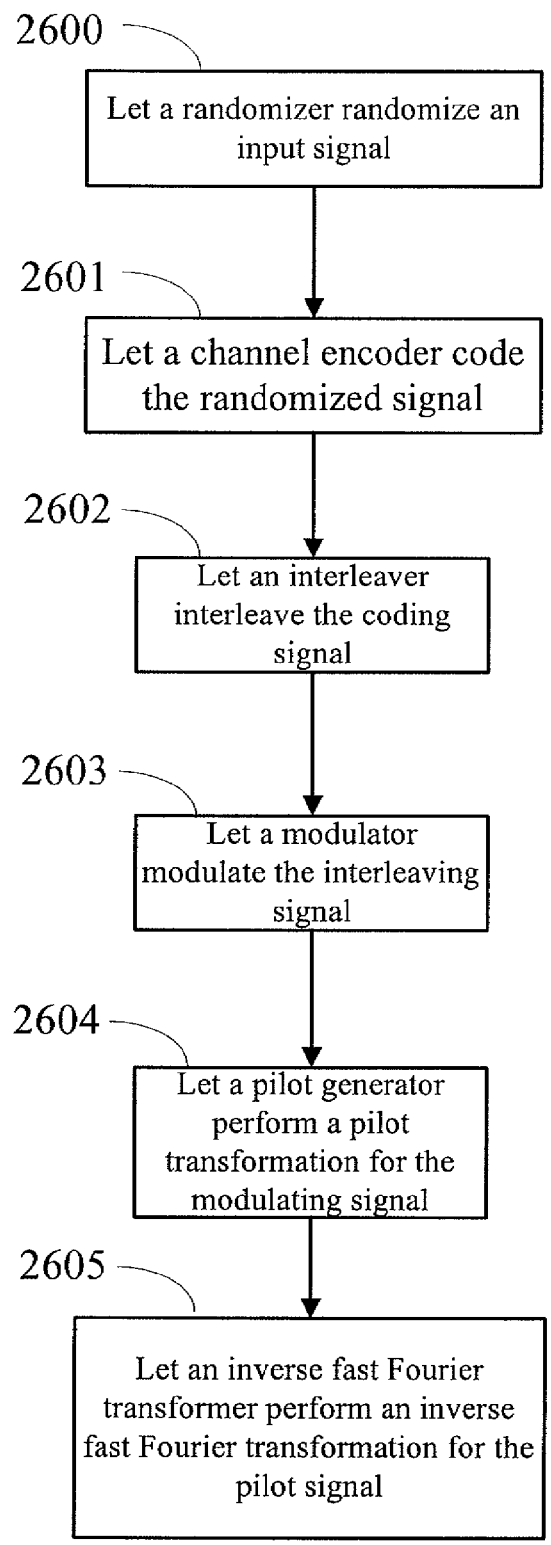
FIG. 26 is a flow chart of step 2403 of an eighth embodiment of the invention.

In next step 2401, the controller 1102 generates the control signal 213 and the report signal 609 according to the information 212. In step 2402, the adjuster 205 is configured to generate the gain adjustment signal 214 according to the gain control content of the control signal 213. In step 2403, the second de-converter 1101 de-converts the report signal 609 to generate the transmission signal 610. For a more detailed description, step 2401 comprises the steps as shown in FIG. 26. In step 2600, the randomizer 700 randomizes the inputted signal to generate a randomizing signal. In step 2601, the channel encoder 701 performs coding for the randomizing signal to generate a coding signal. The following steps 2602, 2603, 2604 and 2605 are the same as steps 2301, 2302, 2303 and 2304 of the sixth embodiment and thus no unnecessary details are given here. In next step 2404, the first switch 204 switches the transmission and receiving modes of the receiver 1100 and the transmitter 207 according to the content of time division duplex in the control signal 213. In final step 2405 and step 2406, the amplifier 206 and the transmitter 207 amplifies, analogizes, and transmits the transmission signal 610 respectively.

Except mentioned steps, the eighth embodiment can further execute operation and method described in the fourth embodiment.

The methods may be implemented via an application program which stored in a computer readable medium. The computer readable medium can be a floppy disk, a hard disk, an optical disc, a removable disk, a tape, a database accessible from a network or any storage medium with the same functionality which can be easily thought by people skilled in the art.

According to above descriptions, the invention can improve drawbacks of the prior art signal relay apparatus. The invention has functionality to dynamically adjust the gain to effectively solve power consumption caused by the incapability to dynamically adjust the gain. Furthermore, the de-modulation difficulty for the de-modulation device to receive the signal caused by the noisy signals amplified together is solved. On the other hand, the invention can regenerate the received signal to reduce an error ratio of the signal.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A signal relay apparatus of a wireless network, comprising:
   a receiver for receiving a wireless signal and converting the wireless signal into a digital signal, wherein the digital signal is identifiable to a physical layer of the wireless network;
   a first converter for converting the digital signal into information, wherein the information is identifiable to a data link layer of the wireless network;
   a controller for generating a control signal after retrieving content related to quality of the wireless signal from the information;
   an adjuster for generating a gain adjustment signal according to the control signal;

an amplifier for adjusting a gain for amplifying a processed signal generated in response to the digital signal according to the gain adjustment signal; and a transmitter for transmitting the processed signal.

2. The signal relay apparatus according to claim 1, further comprising:

a first switch for selecting a first transceiver and a second transceiver of the signal relay apparatus as one of the receiver and the transmitter via TDD (Time Division Duplex) according to the control signal.

3. The signal relay apparatus according to claim 1, further comprising:

a filter for filtering out noise of the digital signal to generate the processed signal.

4. The signal relay apparatus according to claim 1, wherein the receiver comprises:

a second converter for doing sample conversion, timing synchronization and timing equalization on the wireless signal to generate an initial digital signal; and a third converter for doing FFT (Fast Fourier Transform) and de-modulation on the initial digital signal to generate the digital signal, wherein the de-modulation is done based on a modulation process, and the modulation process is one or a combination of 16-quadrature amplitude modulation, 64-quadrature amplitude modulation, 256-quadrature amplitude modulation, binary phase shift keying, and quadrature phase shift keying.

5. The signal relay apparatus according to claim 4, further comprising:

a first de-converter for converting the control signal into a report signal, wherein the report signal is identifiable to the physical layer; and a second switch for selecting one of the digital signal and the report signal according to the control signal;

wherein the transmitter comprises a second de-converter for doing modulation based on the modulation process and IFFT (Inverse Fast Fouier Transform) on the selected signal to generate the processed signal.

6. The signal relay apparatus according to claim 1, wherein the receiver comprises:

a second converter for doing sample conversion, timing synchronization and timing equalization on the wireless signal to generate an initial digital signal;

a third converter for doing FFT and de-modulation on the initial digital signal to generate a de-modulated signal, wherein the de-modulation is done based on a modulation process, and the modulation process is one or a combination of 16-quadrature amplitude modulation, 64-quadrature amplitude modulation, 256-quadrature amplitude modulation, binary phase shift keying, and quadrature phase shift keying;

a de-interleaver for de-interleaving the de-modulated signal to generate a de-interleaved signal; and a decoder for decoding the de-interleaved signal to generate the digital signal.

7. The signal relay apparatus according to claim 6, further comprising:

a first de-converter for converting the control signal into a report signal, wherein the report signal is identifiable to the physical layer; and a second switch for selecting one of the digital signal and the report signal according to the control signal;

wherein the transmitter comprises a second de-converter for coding, interleaving, modulating based on the modulation process, and IFFT on the selected signal to generate the processed signal.

8. The signal relay apparatus according to claim 1, wherein the receiver comprises:

a second converter for doing sample conversion, timing synchronization and timing equalization on the wireless signal to generate an initial digital signal;

a third converter for doing FFT and de-modulation on the initial digital signal to generate a de-modulated signal, wherein the de-modulation is done based on a modulation process, and the modulation process is one or a combination of 16-quadrature amplitude modulation, 64-quadrature amplitude modulation, 256-quadrature amplitude modulation, binary phase shift keying, and quadrature phase shift keying;

a de-interleaves for de-interleaving the de-modulated signal to generate a de-interleaved signal;

a decoder for decoding the de-interleaved signal to generate a decoded signal; and a de-randomizer for de-randomizing the decoded signal to generate the digital signal.

9. The signal relay apparatus according to claim 8, wherein the transmitter comprises:

a second de-converter for randomizing, coding, interleaving, modulating based on the modulation process, and IFFT on the control signal to generate the processed signal.

10. A method for relaying signals in a wireless network, comprising the following steps:

receiving a wireless signal and converting the wireless signal into a digital signal, wherein the digital signal is identifiable to a physical layer of the wireless network;

converting the digital signal into information, wherein the information is identifiable to a data link layer of the wireless network;

generating a control signal after retrieving content related to quality of the wireless signal from the information;

generating a gain adjustment signal according to the control signal;

adjusting a gain for amplifying a processed signal generated in response to the digital signal according to the gain adjustment signal; and transmitting the processed signal.

11. The method according to claim 10, further comprising a step of filtering out noise of the digital signal to generate the processed signal.

12. The method according to claim 10, wherein the receiving step comprises following steps:

doing sample conversion, timing synchronization and timing equalization on the wireless signal to generate an initial digital signal; and doing FFT(Fast Fourier Transform) and de-modulation on the initial digital signal to generate the digital signal, wherein the de-modulation is done based on a modulation process, and the modulation process is one or a combination of 16-quadrature amplitude modulation, 64-quadrature amplitude modulation, 256-quadrature amplitude modulation, binary phase shift keying, and quadrature phase shift keying.

13. The method according to claim 12, further comprising the following steps:

converting the control signal into a report signal, wherein the report signal is identifiable to the physical layer; and selecting one of the digital signal and the report signal according to the control signal;

wherein the transmitting step comprises a step of doing modulation based on the modulation process and IFFT (Inverse Fast Fourier Transform) on the selected signal to generate the processed signal.

14. The method according to claim 10, wherein the receiving step comprises the following steps:
- doing sample conversion, timing synchronization and timing equalization on the wireless signal to generate an initial digital signal;
- doing FFT and de-modulation on the initial digital signal to generate a de-modulated signal, wherein the de-modulation is done based on a modulation process, and the modulation process is one or a combination of 16-quadrature amplitude modulation, 64-quadrature amplitude modulation, 256-quadrature amplitude modulation, binary phase shift keying, and quadrature phase shift keying;
- de-interleaving the de-modulated signal to generate a de-interleaved signal; and
- decoding the de-interleaved signal to generate the digital signal.

15. The method according to claim 14, further comprising the following steps:
- converting the control signal into a report signal, wherein the report signal is identifiable to the physical layer; and
- selecting one of the digital signal and the report signal according to the control signal;
- wherein the transmitting step comprises a step of coding, interleaving, modulating based on the modulation process, and IFFT on the selected signal to generate the processed signal.

16. The method according to claim 10, wherein the receiving step comprises following steps:
- doing sample conversion, timing synchronization and timing equalization on the wireless signal to generate an initial digital signal;
- doing FFT and de-modulation on the initial digital signal to generate a de-modulated signal, wherein the de-modulation is done based on a modulation process, and the modulation process is one or a combination of 16-quadrature amplitude modulation, 64-quadrature amplitude modulation, 256-quadrature amplitude modulation, binary phase shift keying, and quadrature phase shift keying;
- de-interleaving the de-modulated signal to generate a de-interleaved signal;
- decoding the de-interleaved signal to generate a decoded signal; and
- de-randomizing the decoded signal to generate the digital signal.

17. The method according to claim 16, wherein the transmitting step comprises a step of randomizing, coding, interleaving, modulating based on the modulation process, and IFFT on the control signal to generate the processed signal.

18. A computer readable medium storing a computer program to execute a method for relaying signals in a wireless network, the method comprising the following steps:
- receiving a wireless signal and converting the wireless signal into a digital signal, wherein the digital signal is identifiable to a physical layer of the wireless network;
- converting the digital signal into information, wherein the information is identifiable to a data link layer of the wireless network;
- generating a control signal after retrieving content related to quality of the wireless signal from the information;
- generating a gain adjustment signal according to the control signal;
- adjusting a gain for amplifying a processed signal generated in response to the digital signal according to the gain adjustment signal; and
- transmitting the processed signal.

19. The computer readable medium according to claim 18, wherein the method further comprises a step of filtering out noise of the digital signal to generate the processed signal.

20. The computer readable medium according to claim 18, wherein the receiving step comprises following steps:
- doing sample conversion, timing synchronization and timing equalization on the wireless signal to generate an initial digital signal; and
- doing FFT(Fast Fourier Transform) and de-modulation on the initial digital signal to generate the digital signal, wherein the de-modulation is done based on a modulation process, and the modulation process is one or a combination of 16-quadrature amplitude modulation, 64-quadrature amplitude modulation, 256-quadrature amplitude modulation, binary phase shift keying, and quadrature phase shift keying.

21. The computer readable medium according to claim 20, wherein the method further comprises the following steps:
- converting the control signal into a report signal, wherein the report signal is identifiable to the physical layer; and
- selecting one of the digital signal and the report signal according to the control signal;
- wherein the transmitting step comprises a step of doing modulation based on the modulation process and IFFT (Inverse Fast Fourier Transform) on the selected signal to generate the processed signal.

22. The computer readable medium according to claim 18, wherein the receiving step comprises the following steps:
- doing sample conversion, timing synchronization and timing equalization on the wireless signal to generate an initial digital signal;
- doing FFT and de-modulation on the initial digital signal to generate a de-modulated signal, wherein the de-modulation is done based on a modulation process, and the modulation process is one or a combination of 16-quadrature amplitude modulation, 64-quadrature amplitude modulation, 256-quadrature amplitude modulation, binary phase shift keying, and quadrature phase shift keying;
- de-interleaving the de-modulated signal to generate a de-interleaved signal; and
- decoding the de-interleaved signal to generate the digital signal.

23. The computer readable medium according to claim 22, wherein the method further comprises the following steps:
- converting the control signal into a report signal, wherein the report signal is identifiable to the physical layer; and
- selecting one of the digital signal and the report signal according to the control signal;
- wherein the transmitting step comprises a step of coding, interleaving, modulating based on the modulation process, and IFFT on the selected signal to generate the processed signal.

24. The computer readable medium according to claim 18, wherein the receiving step comprises following steps:
- doing sample conversion, timing synchronization and timing equalization on the wireless signal to generate an initial digital signal;
- doing FFT and de-modulation on the initial digital signal to generate a de-modulated signal, wherein the de-modulation is done based on a modulation process, and the modulation process is one or a combination of 16-quadrature amplitude modulation, 64-quadrature amplitude modulation, 256-quadrature amplitude modulation, binary phase shift keying, and quadrature phase shift keying;

de-interleaving the de-modulated signal to generate a de-interleaved signal;

decoding the de-interleaved signal to generate a decoded signal; and de-randomizing the decoded signal to generate the digital signal.

25. The computer readable medium according to claim 24, wherein the transmitting step comprises a step of randomizing, coding, interleaving, modulating based on the modulation process, and IFFT on the control signal to generate the processed signal.

* * * * *